(12) United States Patent
Beyrich et al.

(10) Patent No.: US 7,034,148 B2
(45) Date of Patent: Apr. 25, 2006

(54) METALLOCENYL PHTHALOCYANINES AS OPTICAL RECORDING MEDIA

(75) Inventors: Jürgen Beyrich, Huttingen (DE); Rudolf Blattner, Lörrach (DE); Jean-Luc Budry, Rossemaison (CH); Wolfgang Freitag, Münchenstein (CH); Colin Morton, Basel (CH); Gerald Anthony Murphy, Muttenz (CH); Beat Schmidhalter, Bubendorf (CH); Michael Schulz, Lörrach (DE); Heinz Spahni, Frenkendorf (CH); Christian Stern, Wädenswil (CH); Annemarie Wolleb, Fehren (CH); Heinz Wolleb, Fehren (CH); Roland Zoelper, Basel (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 61 days.

(21) Appl. No.: 10/474,634

(22) PCT Filed: Apr. 9, 2002

(86) PCT No.: PCT/EP02/03945
§ 371 (c)(1),
(2), (4) Date: Oct. 10, 2003

(87) PCT Pub. No.: WO02/083796
PCT Pub. Date: Oct. 29, 2002

(65) Prior Publication Data
US 2004/0132990 A1 Jul. 8, 2004

(30) Foreign Application Priority Data
Apr. 17, 2001 (CH) .............................. 0693/01

(51) Int. Cl.
*C09B 47/04* (2006.01)
*C09B 67/00* (2006.01)
*C07D 487/22* (2006.01)

(52) U.S. Cl. ................ 540/139; 540/128; 540/123; 540/140; 540/125

(58) Field of Classification Search ........ 540/139, 540/128, 123, 140, 125
See application file for complete search history.

(56) References Cited

FOREIGN PATENT DOCUMENTS

| GB | 2112403 | | 7/1983 |
|---|---|---|---|
| GB | 2259517 | | 3/1993 |
| WO | WO 00/09522 | * | 2/2000 |

OTHER PUBLICATIONS

A. Gonzalez et al. Tetrahedron Letters, vol. 40, (1999), pp. 3263–3266.
J. Silver et al., Inorg. Chem. vol. 37, No. 3, (1998), pp. 411–417.
Patent Abstracts of Japan, vol. 011, No. 259, for JP 62059285 (1987).
Patent Abstracts of Japan, vol. 009, No. 107, for JP 59229396 (1984).
Patent Abstracts of Japan, vol. 008, No. 182, for JP 59073994 (1984).

* cited by examiner

Primary Examiner—Richard Raymond
Assistant Examiner—Paul V. Ward
(74) Attorney, Agent, or Firm—Shiela A. Loggins; Joseph Suhadolnik

(57) ABSTRACT

Mixtures of metallocenyl phthalocyanines obtainable by reacting a mixture A comprising two phthalocyanines (I) and (II) with a metallocene derivative in the presence of a catalyst, and also oligomeric metallocenyl phthalocyanines, processes for preparing them, their use for, inter alia, optical recording and optical recording media

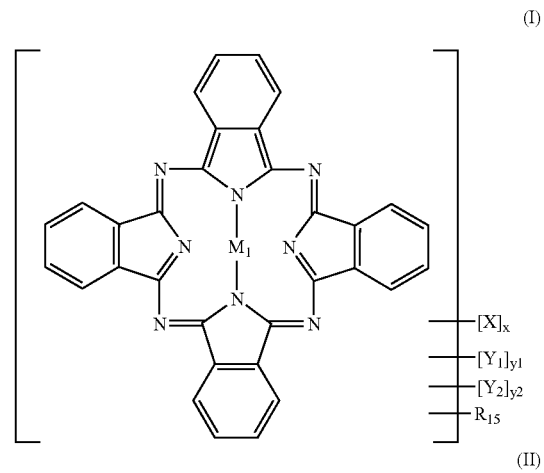

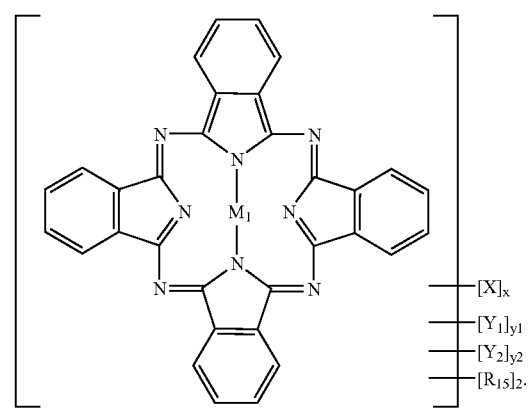

10 Claims, No Drawings

METALLOCENYL PHTHALOCYANINES AS OPTICAL RECORDING MEDIA

The present invention relates to metallocenyl phthalocyanines, their mixtures, processes for preparing them and their use for optical recording.

The invention is in the field of optical data storage, preferably for write-once storage media. In these, the information is stored by means of different optical properties of a dye at written and unwritten points. Such storage media are known, for example, under the name "WORM" systems (write once read many), and are further subdivided into, for example, "CD-R" or "DVD-R".

The use of dyes which absorb radiation in the near infrared region (NIR region) for recording information in WORM systems is described, for example, by M. Emmelius in Angewandte Chemie, number 11, pages 1475–1502 (1989). Laser irradiation can produce the changes in absorption necessary for recording information in digital form in such recording materials by means of physical (for example by sublimation or diffusion) or chemical changes (for example photochromy, isomerization or thermal decomposition of the dye).

Substituted phthalocyanines represent an important class of dyes for use in such WORM systems, since they have strong NIR absorptions in the range from 700 nm to 900 nm when appropriately substituted, regardless of the central metal atom which is customarily present.

The recording layer to be used has to meet very demanding requirements such as high index of refraction and low absorption at the laser wavelength, high contrast of the written pits, uniformity of the pit with different pit lengths, high light stability in daylight and under weak laser radiation (reading) while at the same time having a high sensitivity under intense laser radiation (writing), high long-term stability, low noise, high resolution and, as a particularly important aspect, a very small systematic and random deviation ("jitter") of the pit lengths from a prescribed value at optimum writing power.

Since the recording layer is generally applied from a solution, for example by spin coating, the dyes should be readily soluble in customary solvents, for example as described in EP-A 511 598 (independently of the distinction between polar and nonpolar solvents made there).

Polymeric or oligomeric phthalocyanines, i.e. compounds comprising at least two phthalocyanine units which are generally connected to one another via a single bond or an atom or molecule serving as a bridge, for optical recording are known per se. For example, JP-A 59073994 describes polymeric recording materials which have macrocycles made up of phthalocyanines in the main chain.

JP-A 59229396 describes recording materials comprising dye oligomers in which at least two molecules, for example phthalocyanines containing vanadium or vanadium oxide, VO, as central atom, are connected to one another by a —COO group or a unit containing at least two —COO groups.

JP-A 62059285 describes phthalocyanine compounds of the formula Pc-(CONH-L-OH)$_n$, where Pc is a phthalocyanine radical containing a central atom, e.g. Co(II), L is $C_1$–$C_5$alkylene and n is a number greater than or equal to one, which can be polymerized by polyaddition or polycondensation.

GB-A 2259517 describes polymeric phthalocyanines of the formula (Q-X—)$_q$Pc(-X-Q-Y)$_p$, where X is O, S, Se, Te, NH, N-alkyl or N-aryl, Q is a carbon atom or an aromatic or heterocyclic radical, Y is a reactive group capable of forming a bridge and $p \geq 2$, $q \geq 0$, $16 \geq (p+q)$.

Phthalocyanine compounds containing at least one ferrocene unit as substituent are likewise known. Thus, for example, J. Organomet. Chem. 468(1–2) (1994) 205–212 describes 1,1″,1‴,1⁗-(29H, 31H-phthalocyanine-2,9,16,23-tetrayl)tetrakisferrocene, Chin. Chem. Lett. 4(4) (1993) 339–342 describes [1-(11-ferrocenylundecyl)-1'-[4-[4-[[9,16,23-tris(2,2-dimethylpropoxy)-29H,31H-phthalocyanin-2-yl]oxy]phenoxy]butyl]-4,4'-bipyridiniumato(2-)-$N^{29}$,$N^{30}$,$N^{31}$,$N^{32}$]zinc dibromide, New J. Chem. 21(2) (1997) 267–271 describes 1,1″-[[9,23-bis(dodecylthio)-29H,31H-phthalocyanine-2,16-diyl]bis(nitrilomethylidine)]bisferrocene and J. Organomet. Chem. 541(1–2) (1997) 441–443 describes the synthesis of [Cp(dppe)Fe—CN—MnPc]$_2$O (where dppe=1,2-ethanediylbis(diphenylphosphine); Cp=cyclopentadienyl; Pc=phthalocyanine).

J. Chem. Soc., Chem. Commun. 1995, 1715–1716, describes the preparation of liquid-crystalline ferrocenyl phthalocyanines by reacting ferrocene carbonyl chloride with a metal-free phthalocyanine bearing a hydroxy group as substituent to form the corresponding ester compound.

Inorg. Chem. 37 (1998) 411–417 describes the synthesis of bis(ferrocenecarboxylato)(phthalocyaninato)silicon, with the ferrocene unit being bound to the central atom.

WO-A 9723354 describes optical recording materials based on phthalocyanines having ferrocene units bound as substituents to, inter alia, the central atom.

WO-A 0009522 describes a metallocenyl phthalocyanine or a complex of this with a divalent metal, oxo-metal, halo-metal or hydroxy-metal in which at least one of the four phenyl rings of the phthalocyanine bears at least one metallocene radical as substituent bound via a bridging unit E, where E is composed of a chain of at least two atoms or atom groups selected from the group consisting of —CH$_2$—, —C(=O)—, —CH(C$_1$–C$_4$alkyl)-, —C(C$_1$–C$_4$alkyl)$_2$—, —NH—, —S—, —O— and —CH=CH—.

The use of CD-R as archiving and backup medium for computer data is increasingly requiring faster writing speeds. On the other hand, when it is to be used as an audiomedium, slow (1×) speeds are desired. This leads to the recording layers continually having to be reoptimized for such broad-band behaviour (until recently 1×–8×, at present 1×–16×, in future 24× and above), which places extraordinarily high demands on the recording layers to be used. It is known that recording layers comprising phthalocyanines display good measured values for intermediate speeds (2×–8×), but less favourable 1× values for the contrast and the length deviation of the pits and lands from the prescribed values and also for their random fluctuations ("jitter").

The term contrast refers to the reflection difference between pit and land or the corresponding modulation amplitude of the high frequency signal. The term jitter refers specifically to a time defect in the change in signal which is attributable to a pit being too short or too long. For example, in a CD-R, the length of the pits or the lands can vary in the range from 3T to 11T, where 1T=231.4 ns at a speed of 1.2 m/s (1×). When, for example, the length of a 3T pit is only slightly too short or too long, this can lead to an increased number of BLERs (=block error rate, which refers to the number of physical errors present on the CD) and thus to lower quality. The BLER should, in accordance with the applicable standard, be less than 220 per second, and in accordance with present market requirements, even below 10–20 per second. The requirements which the recording medium has to meet and the applicable standards (at present laid down in the "orange book") are known to those skilled in the art, so that further explanations on this subject are superfluous.

Various proposals for solving the abovementioned difficulties associated with phthalocyanines have been made; in particular, attempts have been made to reduce the relatively high decomposition temperature compared with other classes of dyes, in particular cyanines.

Thus, the DE-A 4 112 402 proposes a mixture of a phthalocyanine and a cyanine (as light-absorbent element) which absorbs in the abovementioned wavelength range as recording film. However, here too, repeated reading leads to destruction of the light absorber, so that the desired properties are not achieved. In addition, it is known that cyanine dyes are not lightfast and it is therefore usually necessary to add a stabilizer.

EP-A 600 427 describes an optical recording medium whose recording layer comprises a phthalocyanine and an additive, e.g. a ferrocene derivative, a metal acetylacetonate or an antiknock agent. According to that application, the addition of the stated additives improves the recording quality. However, disadvantages are the use of an additional substance in the form of an additive and difficulties in the recovery of the dye left during production of the recording layer, since it is necessary either to remove the active or to readjust its concentration to allow reuse.

JP-A 8-118800 describes optical recording media whose recording layers comprise an azo compound substituted by a ferrocene unit. Mixtures of these azo compounds with, inter alia, phthalocyanines and pentamethinecyanines are also described. A disadvantage here is that a satisfactory recording layer cannot be obtained using either the azo compound or the phthalocyanines alone.

WO-0009522, which has already been discussed above, describes metallocenyl phthalocyanines which can be used as recording materials in optical information storage media and, without further additives, preferably when used in CD-Rs, have significantly improved broad-band behaviour (1×–8×) compared to the previous state of the art and display excellent recording and reproduction characteristics at the wavelength of a semiconductor laser (770–790 nm). Furthermore, these compounds make possible an improved process for recovering the dye used in production of the recording layer. However, the recording materials known hitherto are not able to fully meet the increased requirements at very high writing speeds. In particular, it is found that the optimum thickness of the recording layer is different for different writing speed ranges. While at low writing speeds (1×–2×), an unsatisfactorily low contrast (I11) is generally the critical parameter which can be improved by a relatively thick layer, while at higher writing speeds ($\geq$4×), the critical parameter is generally excessive jitter at short pits or lands (in particular L3T), which can be reduced by a relatively thin recording layer. On the other hand, a thin layer requires, undesirably, an increased writing power at a given writing speed, which once again limits the maximum achievable writing speed at a given laser power.

There is therefore a need for improved recording materials which can meet all required specifications over a broadband, i.e. both at low (1×–2×) and very high ($\geq$12×) writing speeds, at one and the same layer thickness and can also be written on at a comparatively low laser power, i.e. has a high sensitivity. Furthermore, it is desirable for production reasons for the broad-band quality to be obtained not only at a particular layer thickness but within the widest possible thickness range, viz. the "processing window". An adequate measure of the scaling of the processing window is the optical density of the recording layer. Accordingly, it is desirable to have recording materials which have a very large positive numerical value of the width of the processing window, while a negative numerical value means that there is no layer thickness at which all specifications can be met over a broadband.

It is therefore an object of the present invention to provide new broad-band recording materials having a large processing window, i.e. an improved positive processing window, and a high sensitivity. In particular, optical recording media having a low layer thickness, improved recycling and writing speeds from above 32× to at least 40× are to be made available.

Accordingly, the claimed mixtures, metallocenyl phthalocyanine compounds, processes for preparing them, their use, optical recording media comprising these mixtures or compounds and values have been found.

In particular, the present invention provides mixtures of metallocenyl phthalocyanines obtainable by reacting a mixture A comprising (a) from 1 to 99% by weight, preferably from 50 to 95% by weight, of a phthalocyanine of the formula I

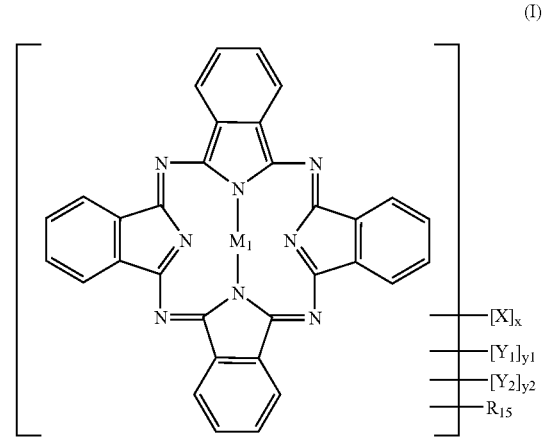

(I)

where $M_1$ is a divalent metal, an oxo-metal group, a halo-metal group or a hydroxy-metal group or two hydrogen atoms, where one or two ligands may be bound to the divalent metal atom, the oxo-metal group, the halo-metal group or the hydroxy-metal group, X is halogen such as chlorine, bromine or iodine, preferably chlorine or bromine, $Y_1$ is —$OR_1$, —OOC—$R_2$, —$NHR_1$, —N($R_1$)$R_2$, —$SR_1$, preferably —$OR_1$, $Y_2$ is —CHO, —CH(OR$_3$)OR$_4$, —CH=N—OH, —CH=N—OR$_3$, —CH=N—NHR$_5$, —CH=N—N(R$_3$) $R_5$, —CH$_2$OH, —(CH$_2$)$_{2-20}$OH, —CH$_2$OR$_3$, —CH$_2$OOC—R$_3$, —CO—R$_3$, —COOH or —COOR$_3$, $R_1$ to $R_5$ can each be, independently of one another, unsubstituted or halogen-, hydroxy-, $C_1$–$C_{20}$alkoxy-, $C_1$–$C_{20}$alkylamino- or $C_2$–$C_{20}$dialkylamino-substituted $C_1$–$C_{20}$alkyl, which may be interrupted by —O—, —S— or —$NR_{11}$—, where $R_{11}$ can be $C_1$–$C_6$alkyl, and $R_1$ and $R_2$ may also be $C_5$–$C_{20}$cycloalkyl, $C_2$–$C_{20}$alkenyl, $C_5$–$C_{12}$cycloalkenyl, $C_2$–$C_{20}$alkynyl, $C_6$–$C_{18}$aryl or $C_7$–$C_{18}$aralkyl, x is a rational number from 0 to 8, preferably from 0 to 5, particularly preferably from 0 to 3, $y_1$ is a rational number from 0 to 6, preferably an integer from 1 to 6, particularly preferably from 3 to 5, very particularly preferably 4, $y_2$ is a rational number from 0 to 4, preferably from 0 to 2, particularly preferably from 0 to 1, where $(x+y_1+y_2) \leq 16$, and $R_{15}$ can be a hydroxyl-containing radical, a carboxyl-containing radical or a radical containing an acid chloride group, preferably —CH$_2$OH, —CH(Me)OH, —COOH, —COCl, and (b) from 99 to 1% by weight, preferably from 50 to 5% by weight, of a phthalocyanine of the formula II

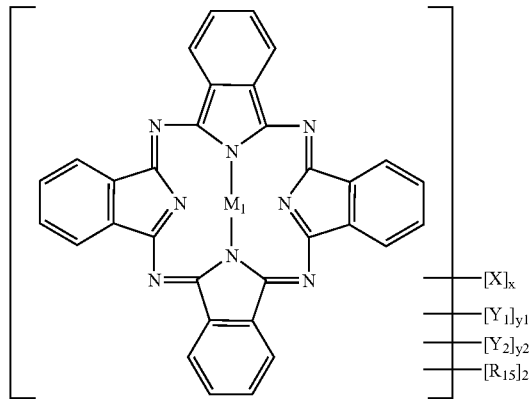

(II)

with a metallocene derivative in the presence of a catalyst.

As divalent metal, it is possible to use divalent transition metal cations, in particular those of copper, zinc, nickel, palladium, platinum, manganese or cobalt, preferably palladium or copper.

As oxo-metal group, it is possible to use VO, MnO or TiO.

As halo-metal group, it is possible to use Al—Cl, Al—Br, Al—F, Al—I, Ga—Cl, Ga—F, Ga—I, Ga—Br, In—Cl, In—F, In—I, In—Br, Tl—Cl, Tl—F, Tl—I, Tl—Br, FeCl or RuCl, or CrCl$_2$, SiCl$_2$, SiBr$_2$, SiF$_2$, SiI$_2$, ZrCl$_2$, GeCl$_2$, GeBr$_2$, GeI$_2$, GeF$_2$, SnCl$_2$, SnBr$_2$, SnI$_2$, SnF$_2$, TiCl$_2$, TiF$_2$, TiBr$_2$.

As hydroxy-metal group, it is possible to use MnOH, Si(OH)$_2$, Ge(OH)$_2$, Zr(OH)$_2$, Mn(OH)$_2$, AlOH or Sn(OH)$_2$.

$C_1$–$C_{20}$Alkyl is, for example, methyl, ethyl, n-, i-propyl, n-, sec-, i-, tert-butyl, n-, neo-pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, preferably $C_1$–$C_{12}$alkyl such as methyl, ethyl, n-, i-propyl, n-, sec-, i-, tert-butyl, n-, neo-pentyl, hexyl, heptyl, octyl, nonyl, decyl, undecyl, dodecyl or, in particular, branched $C_3$–$C_{12}$alkyl such as i-propyl, sec-, i-, tert-butyl, neo-pentyl, 1,2-dimethylpropyl, 1,3-dimethylbutyl, 1-isopropylpropyl, 1,2-dimethylbutyl, 1,4-dimethylpentyl, 2-methyl-1-isopropylpropyl, 1-ethyl-3-methylbutyl, 3-methyl-1-isopropylbutyl, 2-methyl-1-isopropylbutyl or 1-tert-butyl-2-methylpropyl and $C_1$–$C_6$alkyl such as methyl, ethyl, n-, i-propyl, n-, sec-, i-, tert-butyl, n-, neo-pentyl, n-hexyl, 2,2-dimethylhexyl, particularly preferably $C_1$–$C_4$alkyl such as methyl, ethyl, n-, i-propyl, n-, sec-, i-, tert-butyl or 2,4-dimethyl-3-pentyl.

$C_5$–$C_{20}$Cycloalkyl is, for example, cyclopentyl, cyclohexyl, cycloheptyl, cyclooctyl, cyclononyl, cyclodecyl, cycloundecyl, cyclododecyl, cyclotridecyl, cyclotetradecyl, cyclopentadecyl, cyclohexadecyl, cycloheptadecyl, cyclooctadecyl, cyclononadecyl, cycloeicosyl, preferably $C_5$–$C_8$cycloalkyl such as cyclopentyl, cyclohexyl, cycloheptyl, cyclooctyl, or bicycloalkyl such as

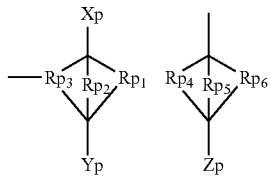

where Xp, Yp and Zp can each be, independently of one another, hydrogen, halogen, methyl or ethyl, and Rp$_1$ to Rp$_6$ can each be, independently of one another, $C_1$–$C_4$alkyl which may be unsubstituted or halogen-substituted. Preferred bicycloalkyl radicals are, for example, derivatives such as

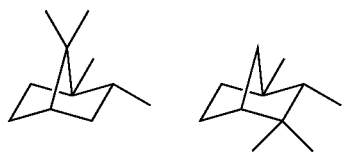

The preparation of phthalocyanines bearing such bicycloalkyl ligands is described in detail in U.S. Pat. No. 6,348,250, so that further details on this subject are superfluous here.

$C_1$–$C_{20}$Alkenyl is, for example, ethenyl, n-, i-propenyl, n-, sec-, i-, tert-butenyl, n-, neo-pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, eicosenyl, preferably $C_2$–$C_6$alkenyl such as ethenyl, n-, i-propenyl, n-, sec-, i-, tert-butenyl, n-, neo-pentenyl, n-hexenyl, particularly preferably $C_2$–$C_4$alkenyl such as ethenyl, n-, i-propenyl, n-, sec-, i-, tert-butenyl.

$C_5$–$C_{12}$Cycloalkenyl is, for example, cyclopentenyl, cyclohexenyl, cycloheptenyl, cyclooctenyl, cyclononenyl, cyclodecenyl, cycloundecenyl, cyclododecenyl, preferably $C_5$–$C_8$cycloalkenyl such as cyclopentenyl, cyclohexenyl, cycloheptenyl, cyclooctenyl.

$C_2$–$C_{20}$Alkynyl is, for example, ethynyl, n-, i-propynyl, n-, sec-, i-, tert-butynyl, n-, neo-pentynyl, hexynyl, heptynyl, octynyl, nonynyl, decynyl, undecynyl, dodecynyl, tridecynyl, tetradecynyl, pentadecynyl, hexadecynyl, heptadecynyl, octadecynyl, nonadecynyl, eicosynyl, preferably $C_2$–$C_6$alkynyl such as ethynyl, n-, i-propynyl, n-, sec-, i-, tert-butynyl, n-, neo-pentynyl, n-hexynyl, particularly preferably $C_2$–$C_4$alkynyl such as ethynyl, n-, i-propynyl, n-, sec-, i-, tert-butynyl.

$C_6$–$C_{18}$Aryl is, for example, phenyl, 1-, 2-naphthyl, indenyl, azulenyl, acenaphthylenyl, fluorenyl, phenanthrenyl, anthracenyl, triphenylene, preferably phenyl.

$C_7$–$C_{18}$Aralkyl is, for example, benzyl, phenethyl, phenyl-(CH$_2$)$_{3-12}$—, preferably benzyl.

$C_1$–$C_{20}$Alkoxy is, for example, methoxy, ethoxy, n-, i-propoxy, n-, sec-, i-, tert-butoxy, n-, neo-pentoxy, hexoxy, heptoxy, octoxy, nonoxy, decoxy, undecoxy, dodecoxy, tridecoxy, tetradecoxy, pentadecoxy, hexadecoxy, heptadecoxy, octadecoxy, nonadecoxy, eicosoxy, preferably $C_1$–$C_6$alkoxy such as methoxy, ethoxy, n-, i-propoxy, n-, sec-, i-, tert-butoxy, n-, neo-pentoxy, n-hexoxy, 2,2-dimethylhexoxy, particularly preferably $C_1$–$C_4$alkoxy such as methoxy, ethoxy, n-, i-propoxy, n-, sec-, i-, tert-butoxy.

$C_1$–$C_{20}$Alkylamino is, for example, methylamino, ethylamino, n-, i-propylamino, n-, sec-, i-, tert-butylamino, n-, neo-pentylamino, hexylamino, heptylamino, octylamino, nonylamino, decylamino, undecylamino, dodecylamino, tridecylamino, tetradecylamino, pentadecylamino, hexadecylamino, heptadecylamino, octadecylamino, nonadecylamino, eicosylamino, preferably $C_1$–$C_6$alkylamino such as methylamino, ethylamino, n-, i-propylamino, n-, sec-, i-, tert-butylamino, n-, neo-pentylamino, n-hexylamino, particularly preferably $C_1$–$C_4$alkylamino such as methylamino, ethylamino, n-, i-propylamino, n-, sec-, i-, tert-butylamino.

$C_2$–$C_{20}$Dialkylamino is, for example, dimethylamino, diethylamino, n-, i-dipropylamino, n-, sec-, i-, tert-dibutylamino, n-, neo-dipentylamino, dihexylamino, diheptylamino, dioctylamino, dinonylamino, didecylamino, diundecylamino, didodecylamino, ditridecylamino, ditetradecylamino, dipentadecylamino, dihexadecylamino, diheptadecylamino, dioctadecylamino, dinonadecylamino, dieicosylamino, preferably $C_1$–$C_6$alkylamino such as dimethylamino, diethylamino, n-, i-dipropylamino, n-, sec-, i-, tert-dibutylamino, n-, neo-dipentylamino, n-dihexylamino, particularly preferably $C_1$–$C_4$alkylamino such as dimethylamino, diethylamino, n-, i-dipropylamino, n-, sec-, i-, tert-dibutylamino.

As phosphorus-containing $C_1$–$C_4$alkyl, preference is given to using methylene, ethylene, propylene or butylene substituted by diphenylphosphine radicals, e.g. —$CH_2$-$PAr_2$ or —CH(Me)—$PAr_2$, where Ar is unsubstituted or substituted phenyl.

As diarylphosphines, it is possible to use, for example, diphenylphosphine and substituted diphenylphosphines.

The reaction according to the invention is generally carried out by esterification of the mixture A by means of a metallocene derivative in the presence of a catalyst, by reacting the mixture A with a metallocene derivative, preferably one selected from the group consisting of hydroxyl-containing metallocenes, carboxyl-containing metallocenes and metallocenes containing an acid chloride group, preferably from the group consisting of metallocene carbonyl chlorides $CpM_2Cp'$-COCl, metallocenecarboxylic acids $CpM_2Cp'$-COOH, where Cp is

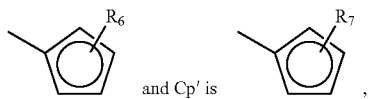

and Cp' is and metallocene alcohols, generally in a manner known per se.

Particular preference is given to using a mixture A in which $R_{15}$ is a hydroxyl-containing radical and the metallocene bears a carboxyl-containing radical or a radical containing an acid chloride group. Equal preference is given to the variant in which $R_{15}$ is a carboxyl-containing radical or a radical containing an acid chloride group and the metallocene is a hydroxyl-containing radical.

The reaction can likewise be carried out in a manner known per se by condensation of two hydroxyl-containing radicals to form an ether or by fusion of one hydroxyl-containing radical with an amine-containing radical to form a urethane.

The other above-described possible radicals for $R_{15}$ are preferably obtainable by analogous methods.

The starting compounds I and II can, if they have an OH-containing substituent, generally be obtained by reduction of corresponding formyl compounds, preferably the corresponding aldehyde, for example by the process described in WO 98/14520. The reduction of an aldehyde is preferably carried out using a complex metal hydride such as sodium borohydride. The reduction is particularly preferably carried out using a complex metal hydride on an inert support material such as a zeolite, a filter aid, a silicate, an aluminium oxide ("Alox"), very particularly preferably using sodium borohydride on Alox. The carboxyl group can be obtained in a manner known per se by oxidation of the corresponding formyl compound, and can, if desired, be converted into the corresponding acid chloride.

The formyl compounds are themselves obtained, for example, by a method also described in WO 98/14520 by reacting the phthalocyanines III

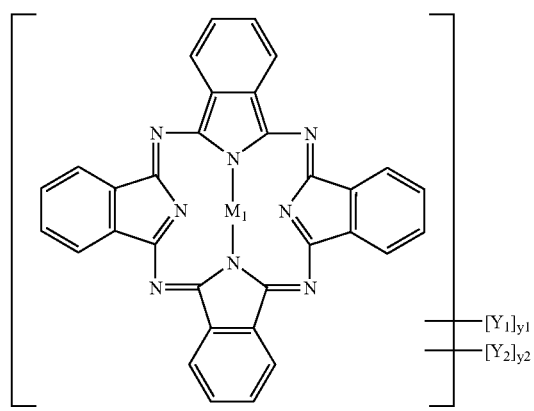

known from, for example, EP-B 373 643 in a Vilsmeier reaction with, preferably, phosphorus oxychloride/dimethylformamide or phosphorus oxychloride/N-methylformanilide.

The corresponding halogenated compounds I to III (for x≠0) are obtained, for example, by halogenation of the corresponding formyl compounds before then being reduced to give the corresponding alcohol compounds V.

The halogenation can be carried out by customary methods as described in EP-A 513,370 or EP-A 519,419, for example by admixing the desired phthalocyanines with bromine in an organic solvent such as a saturated hydrocarbon, ether or halogenated hydrocarbon or, as in the method described in EP-A 703,281, in a two-phase system comprising water and a halogenated aromatic solvent which is essentially immiscible with water, if desired with heating. The halogenation can equally well be carried out only after reaction of the mixture A with the metallocene derivatives.

As metallocene carbonyl compounds, preference is given to using ferrocenecarboxylic acid and derivatives such as esters and halides, preferably ferrocenecarboxylic acid,

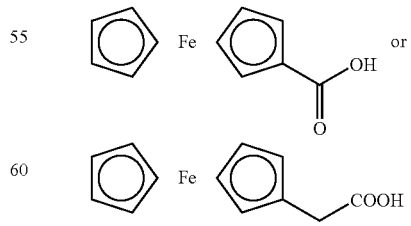

Metallocene carbonyl compounds are generally commercially available or are obtainable by known methods as described in Org. Synthesis 56 (1977) 28–31. Ferrocene derivatives are also obtainable by the methods described in "The Synthesis of Substituted Ferrocenes and Other π-Cyclopentadienyl-Transition Metal Compounds, Org. Reactions 17, 1969, 1/154, 21/3, 99/100". Specifically, the abovementioned ferrocenylacetic acid is obtainable by the following synthetic route:

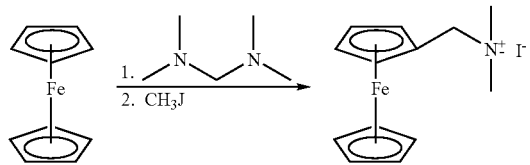

Org. Syn. 40, 1960, 31/3, 45/6, 52; J. Chem. Soc., 1958, 656–660

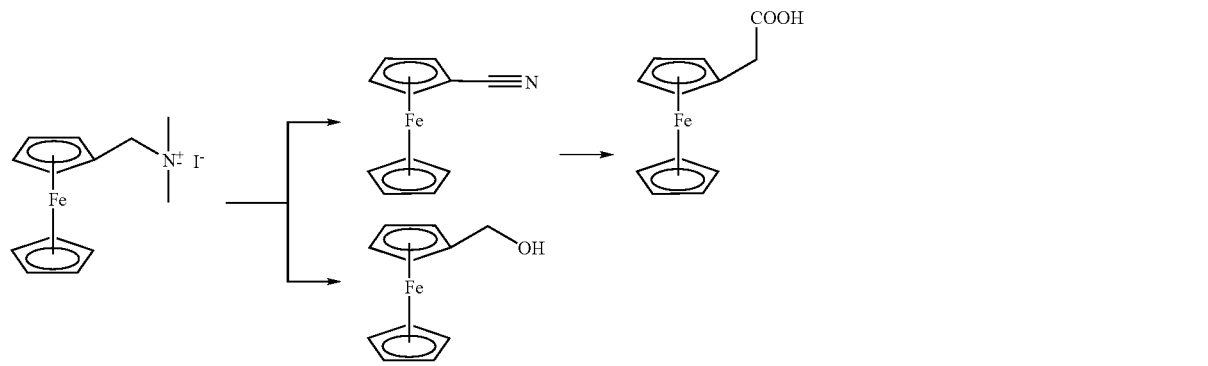

Org. Syn. 40, 1960, 31/3, 45/6, 52; J. Org. Chem. 23, 1958, 653–655

Further ferrocene derivatives such as ferrocenylbutyric acid or ferrocenoylpropionic acid are described, for example, in J. Am. Chem. Soc. 79, 3420–3424 (1957); Docl. Acad. Nauk SSSR 118, 1958, 512/4; Proc. Acad. Sci. USSR Chem. Sect. 118, 1958, 81/3; U.S. Pat. No. 3,222,373. Bifunctional ferrocene derivatives such as ferrocenedicarboxylic acid or 1,1'-bishydroxymethylferrocene can also be incorporated as a bridge between two phthalocyanine units. The preparation of, for example, ferrocenedicarboxylic acid is carried out by a method similar to that of J. Polymer Sci., 54, 651 (1961); 1,1'-bishydroxymethylferrocene is commercially available (e.g. ALDRICH, No. 37, 262–5, Registry No. 1291-48-1 CHEMCATS).

The molar ratio of metallocene carbonyl compound to the mixture A usually depends on the desired degree of esterification and the molar ratio of the phthalocyanines I and II. Preference is given to a range from 5:1 to 0.5:1, particularly preferably from 2:1 to 1:1.

The reaction is usually carried out in a solvent. Solvents used are, for example, aprotic organic solvents such as pyridine, chlorobenzene, toluene, xylene, tetrahydrofuran, chloroform, methylene chloride or ethyl acetate, or mixtures thereof.

Preference is given to using solvent mixtures comprising a relatively low-boiling polar solvent and a relatively high-boiling nonpolar solvent, in particular when an acid-catalyzed esterification using a carboxylic acid or a carboxylic ester (transesterification) is carried out. Depending on the solubility of the ferrocene derivative used, the addition of a polar solvent may also be dispensed with.

The relatively low-boiling polar solvent is then preferably distilled off together with the resulting water (or alcohol) of reaction from the reaction mixture during the course of the reaction.

The weight ratio of polar to nonpolar solvent is usually in the range from 10:1 to 1:10, preferably from 4:1 to 1:1.

The weight ratio of solvent mixture to mixture A is generally in the range from 2:1 to 50:1, preferably from 5:1 to 20:1.

As catalysts for the reaction, preference is given to using acids as are customary in the esterification of alcohols with carboxylic acids or in the esterification of two alcohol components:

These are, for example:

Mineral acids such as $H_2SO_4$, HCl, HBr, $HClO_4$, $H_3PO_4$,

Aromatic sulphonic acids of the formula Ar—$SO_3H$, e.g. p-toluenesulphonic acid Lewis acids such as $FeCl_3$, $AlCl_3$, $ZnCl_2$, $TiOR_4$ (where R=$C_1$–$C_6$alkyl), dibutyltin oxide, dioctyltin oxide.

The amount of catalyst is generally, depending on the catalyst, in the range from 0.01% by weight to 20% by weight, based on the mixture A used. In the case of the strong mineral acids and Lewis acids, amounts of from 0.1 to 1% by weight are usually sufficient.

The reaction temperature is usually in the range from 0° C. to the reflux temperature of the reaction mixture under ambient pressure, preferably from room temperature (20° C.) to 130° C. The reaction temperature usually depends on the solvent used or the chosen composition of the solvent mixture.

On the basis of observations to the present time, the reaction pressure is not critical to the success of the invention. It is advantageously chosen in the range from 70 kPa to 5 MPa, preferably from 90 to 120 kPa.

The reaction is preferably carried out in an inert gas atmosphere such as nitrogen or a noble gas such as neon or argon.

The mixtures of the invention can also be obtained by reducing the formyl compounds obtainable from the phthalocyanines III by the method described in WO 98/14520, for example by means of sodium borohydride, to form the corresponding alcohol compounds subsequently esterifying the latter with a metallocenyl radical and then, if desired, halogenating the products.

A further embodiment of the present invention provides mixtures according to the invention which comprise the following main components:

(a) from 1 to 99% by weight, preferably from 20 to 95% by weight, particularly preferably from 40 to 90% by weight, very particularly preferably from 50 to 80% by weight, of a metallocenyl phthalocyanine IV or its metal complex with a divalent metal, oxo-metal, halo-metal or hydroxy-metal, in which at least one of the four phenyl rings of the phthalocyanine bears at least one metallocene radical as substituent bound via a bridging unit E, where E comprises a chain of at least two atoms or atom groups selected from the group consisting of —$CH_2$—, —$C(=O)$—, —$CH(C_1-C_4alkyl)$-, —$C(C_1-C_4alkyl)_2$—, —NH—, —S— and —O—, or a mixture of different metallocenyl phthalocyanines IV,
and (b) from 99 to 1% by weight, preferably from 80 to 5% by weight, particularly preferably from 60 to 10% by weight, very particularly preferably from 50 to 20% by weight, of a metallocenyl phthalocyanine compound selected from the group consisting of phthalocyanine compounds V comprising two phthalocyanine units linked via a single bond or a bridging atom or molecule, phthalocyanine compounds VI comprising three phthalocyanine units linked in each case via a single bond and/or a bridging atom or molecule and phthalocyanine compounds VII comprising four phthalocyanine units linked in each case via a single bond and/or a bridging atom or molecule.

Preferred metallocenyl phthalocyanines IV or their metal complexes are ones having the formula IVa:

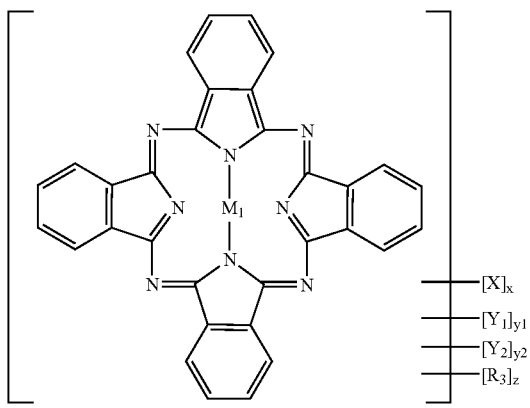

(IVa)

where
$R_3$ is

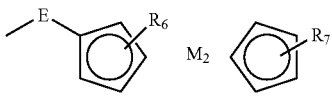

preferably

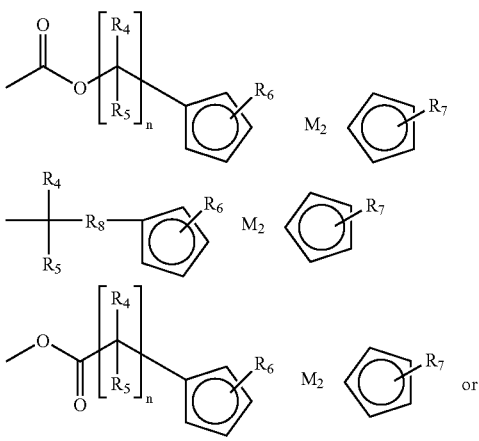

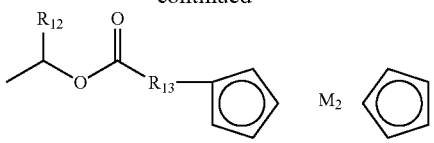

-continued where $R_4$ and $R_5$ can each be, independently of one another, hydrogen or $C_1-C_4$alkyl, n is from 1 to 4, $R_6$ and $R_7$ are each, independently of one another, hydrogen, halogen such as fluorine, chlorine, bromine or iodine, $C_1-C_4$alkyl, $C_1-C_4$alkoxy, amino-$C_1-C_4$alkyl, diarylphosphine or phosphorus-containing $C_1-C_4$alkyl such as —$CH_2$—$PAr_2$ or —$CH(Me)$—$PAr_2$, where Ar is unsubstituted or substituted phenyl, $R_8$ can be —O—$R_9$—, —$C(=O)$—O—$R_9$ or —O—C(=O)—$R_9$—, where $R_9$ can be a single bond, $C_1-C_4$alkylene or $C_2-C_4$alkenylene, and $M_2$ is a divalent transition metal, and $R_{12}$ is hydrogen or methyl and $R_{13}$ is a single bond, —$CH_2$—, —$CH_2CH_2$—, —CH=CH—, —$CH_2$—$C(=O)$— or —$CH_2CH_2$—C(=O)—, z is from 1 to 4, preferably from 1 to 3, particularly preferably from 1 to 2, where $(x+y_1+y_2+z) \leq 16$, and one or two ligands may be bound to the divalent metal atom, the oxo-metal group, the halo-metal group or the hydroxy-metal group, and E is, as indicated further above, a molecular chain selected from the group of consisting of —$CH_2$—, —$C(=O)$—, —$CH(C_1-C_4alkyl)$-, —$C(C_1-C_4alkyl)_2$—, —NH—, —S— and —O—.

Rational or nonintegral values of z, x, $y_1$ and $y_2$ (and also a2 to a8 below) indicate that a mixture of at least two different compounds IV is present, with the molar ratio of the two compounds leading to the corresponding rational number. Thus, for example, z=1.5 would mean that a compound of the formula IV in which z=1 and another compound IV in which z=2 are present in a molar ratio of 1:1.

It may also be pointed out that corresponding structural isomers having different substitution positions on the phenyl rings are included under the general formula IV, but are not shown in the interest of clarity.

These two remarks apply to all formulae depicted in the present patent application.

Particularly preferred metallocenyl phthalocyanines have the formula IVb

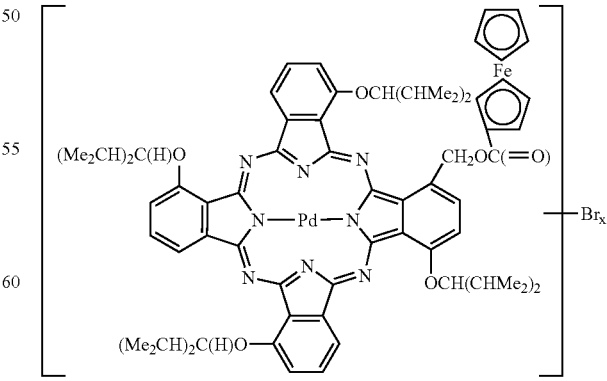

where x=2.6 to 3.0, preferably from 2.7 to 2.9, in particular 2.8, or the formula IVc

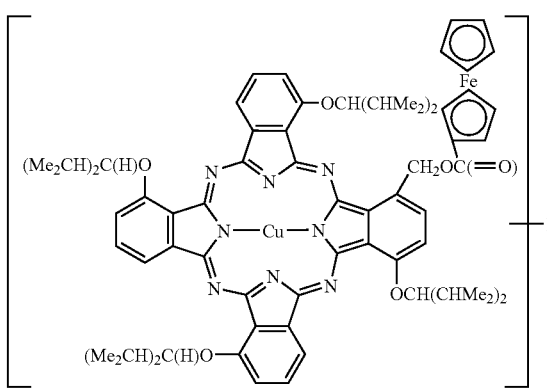

where x=0 to 0.5, preferably 0.

Preference is also given to mixtures of different metallocenyl phthalocyanines IV comprising
(a) from 60 to 95 mol %, preferably from 80 to 95 mol %, of a compound IVd (IVd)

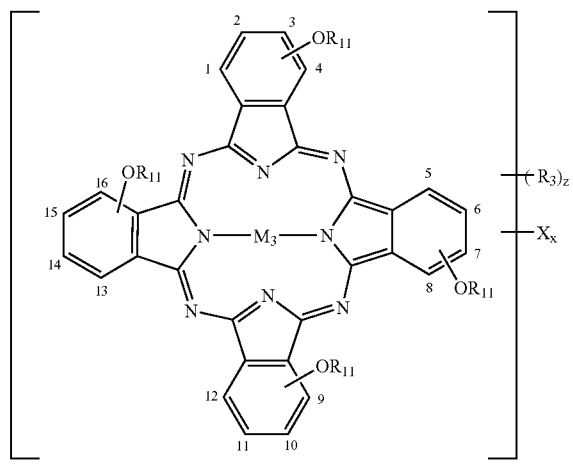

having one radical $R_3$ (z=1),
(b) from 5 to 20 mol %, preferably from 5 to 10 mol %, of a compound IVd having two radicals $R_3$ (z=2)

and
(c) from 0 to 25 mol %, preferably from 0 to 10 mol %, of a compound IVe (IVe)

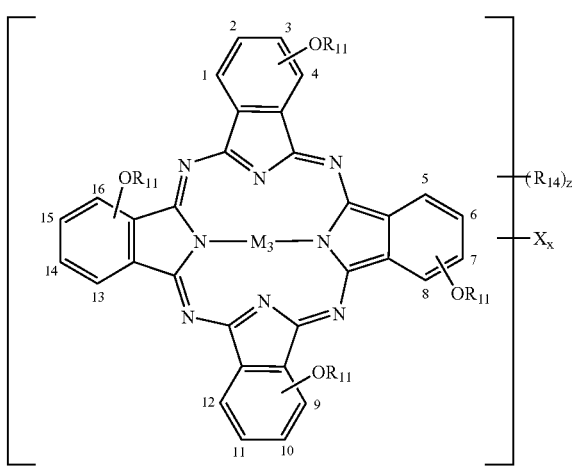

where the radicals —$OR_{11}$, $R_3$=$R_{14}$, X and $M_3$ are each the same in the formulae IVd and IVe and are otherwise as defined above, and the mol % figures add up to 100%.

Furthermore, particular preference is given to mixtures of different metallocenyl phthalocyanines IV comprising
(a) from 60 to 95 mol %, preferably from 80 to 95 mol %, of a compound IVd in which $R_{11}$ is $C_1$–$C_{12}$alkyl and $M_3$ is palladium or copper and z is 1,
(b) from 5 to 20 mol %, preferably from 5 to 10 mol %, of a compound IVd having two radicals $R_3$ (z=2)
and
(c) from 0 to 25 mol %, preferably from 0 to 10 mol %, of a compound IVe in which $R_{14}$ is —CHO, —$CH_2OH$, —COOH, —$CH_2OC(O)$—$C_1$–$C_4$alkyl or an acetal and z can be 1 or 2, where the radicals —$OR_{11}$, $R_3$=$R_{14}$, X and $M_3$ are each the same in the formulae IVd and IVe and are otherwise as defined above, and the mol % figures add up to 100%.

A further embodiment of the present invention provides metallocenyl phthalocyanine compounds selected from the group consisting of phthalocyanine compounds V comprising two phthalocyanine units linked via a single bond or a bridging atom or molecule, phthalocyanine compounds VI comprising three phthalocyanine units linked in each case via a single bond and/or a bridging atom or molecule and phthalocyanine compounds VII comprising four phthalocyanine units linked in each case via a single bond and/or a bridging atom or molecule.

The metallocenyl phthalocyanines V, VI and VII and higher oligomers can be represented by the formula VIII $(Pc)_{a1}(Xa)_{a2}(Ya)_{a3}(Za)_{a4}(Ma)_{a5}(-L-)_{a6}$   VIII where Pc is phthalocyanine or its metal complex of a divalent metal, oxo-metal, halo-metal, hydroxy-metal or 2 hydrogen atoms, and the terms divalent metal, oxo-metal, etc., are as defined above, Xa, Ya, Za, Ma and -L- are substituents on the peripheral carbon skeleton, in particular Xa is halogen, Ya is substituted or unsubstituted alkoxy, alkylamino or alkylthio, Za is a formyl, carbonyl, hydroxymethyl or carboxy group, Ma is a substituent comprising at least one metallocene radical, -L- is a single bond, —$(CH_2)_{a7}$—, where a7=1, 2, 3 or 4, an ether group such as —O— or —$(CH_2)_{a7}$—O—$(CH_2)_{a8}$—, where a8=1, 2, 3 or 4, an ester group, an amide group or a divalent metallocenyl group, and a1 is 1, 2, 3, 4, 5, 6, 7, 8, 9 or 10,
a2 is a rational number from 0 to 8, preferably from 0 to 5, particularly preferably from 0 to 3,
a3 is a rational number from 0 to 6, preferably an integer from 1 to 6, particularly preferably from 3 to 5, very particularly preferably 4,
a4 is a rational number from 0 to 4, preferably from 0 to 2, particularly preferably from 0 to 1,
a5 is a rational number from 0 to 4, preferably from 0 to 2,
a6 is a rational number from 1 to 4, preferably from 1 to 3, where $(a2+a3+a4+a5+a6) \leq 16$ and $1 \leq (a4+a5+a6) \leq 4$.

Particularly preferred oligomeric phthalocyanines of the formulae V to VII and further oligomers having more than four phthalocyanine units have the formula IX

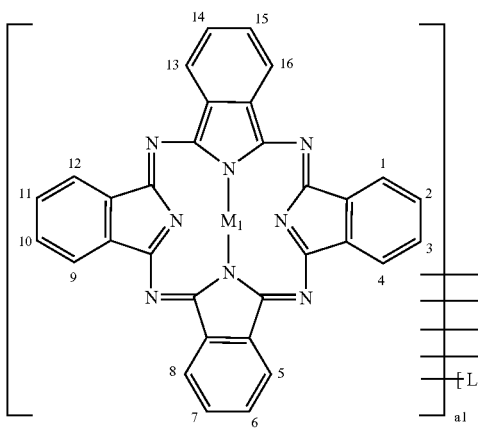

(IX)

where

M₁ is as defined above,

Xa is halogen such as chlorine, bromine or iodine, preferably chlorine or bromine, Ya is preferably —OR₁, —OOC—R₂, —NHR₁, —N(R₁)R₂, —SR₁, preferably —OR₁, Za is preferably —CHO, —CH(OR₃)OR₄, —CH=N—OH, —CH=N—OR₃, —CH=N—NHR₅, —CH=N—N(R₃)R₅, —CH₂OH, —(CH₂)₂₋₂₀OH, —CH₂OR₃, —CH₂OOC—R₃, —CO—R₃, —COOH or —COOR₃, Ma is preferably

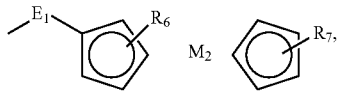

L is preferably -E₂- or

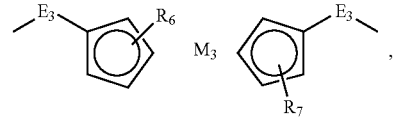

where

M₂ and M₃ are each a divalent transition metal, preferably iron,

E₁, E₂, E₃ are each, independently of one another, —R₈(CH₂)₁₋₂₀R₉—, —R₈(COO)₁₋₂₀R₉—, —R₈OR₉—, —R₈(CONR₁₀)₁₋₂₀R₉—, preferably —(CH₂)₁₋₈—, —(CH₂)₁₋₈(COO)₁₋₈—, —(CH₂)₁₋₈O(CH₂)₁₋₈—, —(CH₂)₁₋₈(CONH)₁₋₈— or —CONH—, R₁ to R₇ are as defined above, R₈ and R₉ are each, independently of one another, a single bond, unsubstituted or halogen-, O—, C₁–C₄alkyl-, C₁–C₄alkoxy- or C₁–C₄alkylamino-substituted C₁–C₂₀alkylene or C₂–C₂₀alkenylene which may be interrupted by —O—, —CO—, —S—, —NR₁₀—, R₁₀ can be H or C₁–C₆alkyl, R₁₁ is H, C₅–C₂₀cycloalkyl, C₂–C20alkenyl, C₅–C₁₂cycloalkenyl, C₂–C₂₀alkynyl, C₆–C₁₈aryl or C₇–C₁₈aralkyl.

A further particularly preferred embodiment provides oligomeric metallocenyl phthalocyanines IX, preferably dimeric (preferably for compound V), trimeric (preferably for compound VI) and tetrameric (preferably for compound VII) phthalocyanines in which, preferably, M₁ is Pd or Cu, Xa is Cl or Br, Ya is —OCH(CHMe₂)₂, Ma is —CH₂OC(=O)Fc (Fc is an unsubstituted ferrocene unit, —FeCp₂) and L is —CH₂—, —CH₂OCH₂— or —CH₂OC(=O)FcC(=O)OCH₂—, a2 is from 0 to 4, a3 is from 2 to 6, particularly preferably 4, a4 is from 0 to 2, a5 is from 0 to 3, a6 is from 1 to 3, where a5+a6 is less than or equal to 3, and Ya, Ma and L are preferably bound to positions 1, 4, 5, 8, 9, 12, 13, 16 of the phthalocyanine skeleton of the formula IX.

Particularly preferred phthalocyanines of the formulae IX and V to VII are:

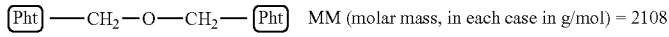

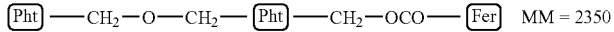

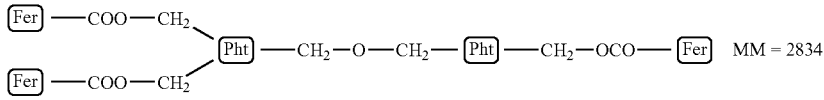

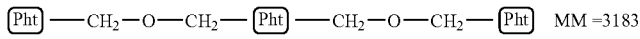

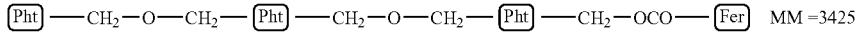

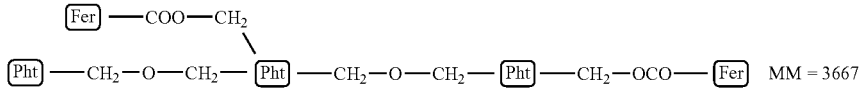

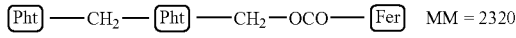

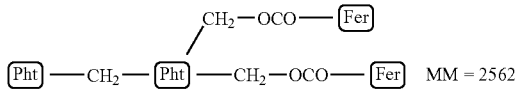

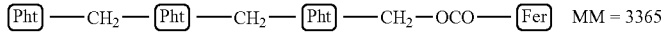

In these formulae:

[Pht]

is copper tetra(α-2,4-dimethyl-3-pentoloxy)phthalocyanine

[Fer]

is ferrocene, i.e. —FeCp$_2$ where the bridging units which join the individual phthalocyanine units to one another, i.e. in particular —CH$_2$—O—CH$_2$— and —CH$_2$—, and also the bridging units L are preferably located in the para position relatively to the alkoxy group (Ya).

A particularly preferred embodiment of the present invention provides a novel compound of the formula VIII or of the more specific formula IX in which a1 is 1, a2 is zero, Ya is 2,4-dimethyl-3-pentyloxy, a3 is 4, a4 is zero, a5 is zero, a6 is 1 and L is —CH$_2$—O—CH$_2$—, and which has the specific formula IXa

[Pht]—CH$_2$—O—CH$_2$—[Pht]  (IXa)

where

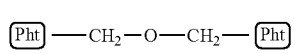

is copper tetra(α-2,4-dimethyl-3-pentyloxy)phthalocyanine and L is preferably located in the para position relative to Ya.

A particularly preferred embodiment of the present invention provides a novel compound of the formula VIII or of the more specific formula IX in which a1 is 2, a2 is zero, Ya is 2,4-dimethyl-3-pentyloxy, a3 is 4, a4 is zero, a5 is 1, Ma is —CH$_2$—OCO—FeCp$_2$, a6 is 1, and L is —CH$_2$—O—CH$_2$—, and which has the specific formula IXb

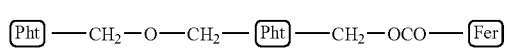  (IXb)

where where

[Pht]

is copper tetra(α-2,4-dimethyl-3-pentyloxy)phthalocyanine, L is preferably located in the para position relative to Ya and

[Fer]

is FeCp$_2$.

A further particularly preferred embodiment of the present invention provides a novel compound of the formula VIII or the more specific formula IX in which a1 is 3, a2 is zero, Ya is 2,4-dimethyl-3-pentyloxy, a3 is 4, a4 is zero, a5 is 0, a6 is 2, and L is —CH$_2$—O—CH$_2$—, and which has the specific formula IXc

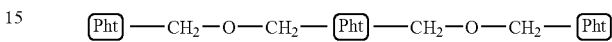  (IXc)

where
wher

[Pht]

is copper tetra(α-2,4-dimethyl-3-pentyloxy)phthalocyanine and L is preferably located in the para position relative to Ya.

A further particularly preferred embodiment of the present invention provides a novel compound of the formula VIII or the more specific formula IX in which a1 is 3, a2 is zero, Ya is 2,4-dimethyl-3-pentyloxy, a3 is 4, a4 is zero, a5 is 1, Ma is —CH$_2$—OCO—FeCp$_2$, a6 is 2 and L is —CH$_2$—O—CH$_2$— and which has the specific formula IXd

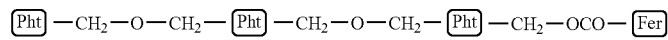  (IXd)

where

[Pht]

is copper tetra(α-2,4-dimethyl-3-pentyloxy)phthalocyanine, L is preferably located in the para position relative to Ya, and

[Fer]

is FeCp$_2$.

A further particularly preferred embodiment provides mixtures comprising a metallocenyl phthalocyanine IV and at least one metallocenyl phthalocyanine IX in which M$_1$ is Pd and X and Xa are each Br, -L- is —CH$_2$— or —CH$_2$OCH$_2$—, x and a2 are each from 2 to 3, preferably from 2.5 to 3, y and a3 are each 4 and z and a6 are each less than or equal to 2, where the content of metallocenyl phthalocyanine or metallocenyl phthalocyanines IX is preferably from 10 to 30% by weight, based on the total mixture.

A further particularly preferred embodiment provides mixtures comprising a metallocenyl phthalocyanine IV and at least one metallocenyl phthalocyanine IX in which M$_1$ is Cu, -L- is —CH$_2$— or —CH$_2$OCH$_2$—, x and a2 are each from 0 to 0.3, particularly preferably 0, X and Xa are each Br, y and a3 are each 4 and z and a6 are less than or equal to 3, where the content of metallocenyl phthalocyanine or metallocenyl phthalocyanines IX is preferably from 20 to 50% by weight, particularly preferably from 30 to 50% by weight, based on the total mixture.

Furthermore, the present invention provides a process for preparing the mixture of the invention by reacting a mixture A comprising
(a) from 99 to 1% by weight of a phthalocyanine of the formula I and
(b) from 1 to 99% by weight of a phthalocyanine of the formula II with a metallocene derivative in the presence of a catalyst.

In addition, the present invention provides a preferred process for preparing the novel metallocenyl phthalocyanine compound IV or compounds V to VIII by separating them from the reaction product obtained by the above process in a manner known per se and isolating them.

A further embodiment provides for the use of the compounds or mixtures of the invention or compounds or mixtures prepared by the processes of the invention for producing an optical recording medium.

A further embodiment provides an optical recording medium comprising a transparent substrate, a recording layer on this substrate, a reflection layer on the recording layer and, if desired, a protective layer on the reflection layer, where the recording layer comprises a mixture according to the invention or a compound according to the invention or a compound or mixture prepared by a process according to the invention.

A further embodiment provides for the use of an optical recording medium according to the invention for optical recording, storage and reproduction of information, for producing diffraction-optical elements or for the storage of holograms.

If desired, the optical recording medium of the invention may comprise more than one recording layer and/or more than one reflective or partially reflective (semitransparent) layer.

The substrate which serves as support for the layers applied thereto is generally semitransparent (i.e. has a transparency T of at least 10%) or, preferably, transparent (T≧90%). The support can have a thickness of from 0.01 to 10 mm, preferably from 0.1 to 5 mm.

The recording layer is preferably located between the transparent substrate and the reflective layer. The thickness of the recording layer is generally from 10 to 1000 nm, preferably from 50 to 500 nm, particularly preferably in the region of 100 nm, for example from 80 to 150 nm. The absorption of the recording layer at the absorption maximum is usually in the range from 0.1 to 2.0, preferably from 0.5 to 2.0. The thickness of the layer is very particularly preferably chosen in a known manner as a function of the respective index of refraction in the unwritten and written states at the reading wavelength so that constructive interference results in the unwritten state and, in contrast, destructive interference results in the written state, or vice versa.

The reflective layer, whose thickness is generally from 10 to 150 nm, preferably has a high reflectivity (R≧70%) and a low transparency (T≦10%).

The uppermost layer, for example the reflection layer or the recording layer depending on the layer structure, is preferably additionally provided with a protective layer which generally has a thickness in the range from 0.1 to 1000 μm, preferably from 0.1 to 50 μm and particularly preferably from 0.5 to 15 μm. This protective layer may also serve as bonding layer for a second substrate layer which is applied thereto and preferably has a thickness of from 0.1 to 5 mm and consists of the same material as the support substrate.

The reflectivity of the overall recording medium is preferably at least 60%, particularly preferably at least 65%, at the writing wavelength of the laser used.

Suitable substrates are, for example, glasses, minerals, ceramics and thermoset or thermoplastic polymers. Preferred supports are glasses and homopolymers and copolymers.

Suitable polymers are, for example, thermoplastic polycarbonates, polyamides, polyesters, polyacrylates and polymethacrylates, polyurethanes, polyolefins, polyvinyl chloride, polyvinylidene fluoride, polyimides, thermoset polyesters and epoxy resins. The substrate can be in pure form or further comprise customary additives, for example UV absorbers or dyes as are proposed in JP 04/167 239 as light protection for the recording layer. In the latter case, it may be advantageous for the dye added to the support substrate to have an absorption maximum which is shifted hypsochromically by at least 10 nm, preferably at least 20 nm, relative to the dye of the recording layer.

The substrate is preferably transparent in at least part of the range from 600 to 830 nm, so that it transmits at least 90% of the incident light at the writing or reading wavelength. The substrate preferably has a spiral guide groove having a groove depth of generally from 50 to 500 nm, a groove width of usually from 0.2 to 0.8 μm and a radial distance between adjacent grooves of generally from 0.4 to 1.6 μm, particularly preferably a groove depth of from 100 to 300 nm and a groove width of from 0.3 to 0.6 μm, on the coated side.

Instead of the substrate, it is also possible, as described in EP-A 392 531, for the recording layer itself to have a groove.

The recording layer consists exclusively or essentially of one or more phthalocyanines according to the invention. However, to increase the stability further, it is possible for known stabilizers to be added in customary amounts, e.g. a nickel dithiolate described in IP 04/025 493 as light stabilizer. If desired, additional dyes can also be added, but advantageously in amounts of not more than 50% by weight, preferably not more than 10% by weight, based on the recording layer. As the advantages of the recording media of the invention depend on the phthalocyanines of the invention, it is advantageous for any added dye to have an absorption maximum shifted hypsochromically relative to the phthalocyanine of the invention and for the amount of the added dye to be kept so small that its contribution to the total absorption of the recording layer in the range from 600 to 830 nm is not more than 20%, preferably not more than 10%. However, particular preference is given to adding no additional dye.

Reflective materials suitable for the reflection layer are, in particular, metals which readily reflect the laser radiation used for writing and reproduction, for example the metals of the third, fourth and fifth main groups and the transition groups of the Periodic Table of the Elements. Particularly useful metals are Al, In, Sn, Pb, Sb, Bi, Cu, Ag, Au, Zn, Cd, Hg, Sc, Y, La, Ti, Zr, Hf, V, Nb, Ta, Cr, Mo, W, Fe, Co, Ni, Ru, Rh, Pd, Os, Ir, Pt and the lanthanide metals Ce, Pr, Nd, Pm, Sm, Eu, Gd, Tb, Dy, Ho, Er, Tm, Yb and Lu, and also their mixtures and alloys. For reasons of high reflectivity and ease of manufacture, particular preference is given to a reflection layer of aluminium, silver, copper, gold or alloys thereof.

Suitable materials for the protective layer are mainly synthetic polymers which can be applied in a thin layer either directly of with the aid of bonding layers to the support or the uppermost layer. It is advantageous to choose mechanically and thermally stable polymers which have good surface properties and can be modified further, for example printed on. Both thermoset polymers and thermoplastic polymers are possible. Preference is given to radiation-cured (for example by means of UV radiation) protective layers which are particularly simple and economical to produce. A large number of radiation-curing materials are known. Examples of radiation-curing monomers and oligomers are acrylates and methacrylates of diols, triols and tetrols, polyimides of aromatic tetracarboxylic acids and aromatic diamines having $C_1$–$C_4$alkyl groups in at least two ortho positions relative to the amino groups, and oligomers containing dialkyl maleimidyl groups, for example dimethylmaleimidyl groups.

The recording media of the invention can also have additional layers such as interference layers. If is also possible to construct recording media having a plurality of recording layers (for example two recording layers). The structure and use of such materials are known to those skilled in the art. If interference layers are employed, preference is given to interference layers which are located between the recording layer and the reflective layer and/or between the recording layer and the substrate and consist of a dielectric material, for example, $TiO_2$, $Si_3N_4$, ZnS or silicone resins as described in EP-A 353 393.

The recording media of the invention can be produced by methods known per se using, as a function of the materials employed and the way in which they function, various coating techniques.

Suitable coating methods are, for example, dipping, casting, painting, doctor blade coating and spin coating and also vapour deposition processes carried out in a high vacuum. When using, for example, casting methods, solutions in organic solvents are generally employed. When using solvents, it is preferably ensured that the supports employed are not sensitive to the solvents. A particularly advantage of the dyes of the invention is that they are readily soluble either as pure compounds or as mixtures of only a few components in less polar solvents, so that aggressive solvents such as acetone and complicated isomer mixtures can be dispensed with. Suitable coating methods and solvents are described, for example, in EP-A 401 791.

The recording layer is preferably applied by spin coating with a dye solution. Solvents which have been found to be useful for this purpose are, in particular, alcohols such as 2-methoxyethanol, cyclopentanol, isopropanol, isobutanol, diacetone alcohol, n-butanol or amyl alcohol, preferably cyclopentanol, diacetone alcohol or amyl alcohol, or preferably fluorinated alcohols such as 2,2,2-trifluoroethanol or 2,2,3,3-tetrafluoro-1-propanol and also cyclohexane, methylcyclohexane, 2,6-dimethyl-4-heptanone and diisobutyl ketone or mixtures thereof, preferably amyl alcohol and 2,6-dimethyl4-heptanone. Preference is also given to mixtures of dibutyl ether and 2,6-dimethyl4-heptanone or -heptanol.

Particular preference is also given to the incorporation of additives such as surfactants or quenchers, in particular peroxide quenchers, particularly preferably hydroquinone monomethyl ether, which are usually used in amounts in the ppm range, e.g. in the range from 1 to 10 ppm.

The metallic reflection layer is preferably applied by sputtering or vapour deposition under reduced pressure. Owing to the good adhesion to the support, the sputtering technique is particularly preferred for application of the metallic reflection layer. This technique is comprehensively described both in textbooks (e.g. J. L. Vossen and W. Kern, "Thin Film Processes", Academic Press, 1978) and in the prior art (e.g. EP-A 712 904), so that further details are unnecessary here.

The structure of the recording medium of the invention generally depends mainly on the reading method; known functional principles are measurement of the change in the transmission or, preferably the reflection.

If the recording material is constructed for measurement of a change in the reflection, it is possible to employ, for example, the following structures: transparent support/recording layer (one or more layers)/reflection layer and, if appropriate, protective layer (not necessarily transparent), or support (not necessarily transparent)/reflection layer/recording layer and, if appropriate, transparent protective layers. In the first case, the light comes in from the support side, while in the second case, the radiation comes in from the side of the recording layer or, if present, the protective layer. In both cases, the light detector is on the same side as the light source. The first structure of the recording material to be used according to the invention is generally preferred.

If the recording material is constructed for measurement of a change in the light transmission, the following alternative structure, for example, is possible: transparent support/recording layers (one or more layers) and, if appropriate, transparent protective layer. The light for writing or for reading can come in either from the support side or the side of the recording layer or, if present, the protective layer, with the light detector in this case always being present on the opposite side.

A further embodiment of the present invention therefore provides an optical recording medium comprising a metallocenyl phthalocyanine of the invention or a mixture thereof or a metallocenyl phthalocyanine prepared according to the invention.

A preferred embodiment provides an optical recording medium comprising a transparent substrate, a recording layer on this substrate, a reflection layer on the recording layer and, if desired, a final protective layer, where the recording layer comprises a metallocenyl phthalocyanine according to the invention or prepared according to the invention or a mixture thereof.

Recording (inscription, writing) and reading of the information is preferably carried out by means of laser radiation. Suitable lasers are, for example, commercial semiconductor diode lasers, for example GaAsAl, InGaAlP, GaAs or GaN laser diodes having a wavelength of 635, 650, 670, 680, 780 or 830 nm or 390–430 nm, or gas/ion lasers, for example He/Ne, Kr, HeCd or Ar lasers having a wavelength of 602, 612, 633, 647, or 442 and 457 nm.

Recording is preferably carried out by inscribing pits of variable length by means of pulse-length-modulated laser radiation focused on the recording layer. The recording speed chosen depends on the focusing geometry and laser power and can be, for example, in the range from 0.01 to 100 m/s, preferably 1–50 m/s (corresponding 1× to 40×) or even above, e.g.1× to 48×.

Reading of the information is preferably carried out by localized measurement of reflection or transmission using laser radiation of low power and a photodetector. It is particularly advantageous to be able to employ laser radiation of the wavelength used for recording, so that no second laser instrument has to be used. In a preferred embodiment, recording and reading of information are therefore carried out at the same wavelength. During reading, the power of the laser used is generally reduced compared with the laser radiation used for recording, for example to from one tenth to one fiftieth. In the case of the recording materials used according to the invention, the information can be read one or more times. Suitable photodetectors include, preferably, PIN and AV photodiodes and also CCDs (charge-coupled devices).

A further embodiment provides recording layers comprising the compounds of the invention or mixtures thereof and also provides optical recording media which are produced therefrom and further comprise additives such as stabilizers or dyes to modify the spectral properties or colour, with the additive content preferably being in the range from 0.001 to 20% by weight, based on the recording layer.

Such dyes are known to those skilled in the art, for example from EP-A 376 327, and include, for example, cyanines, coumarins, alantoin dyes, azo dyes such as

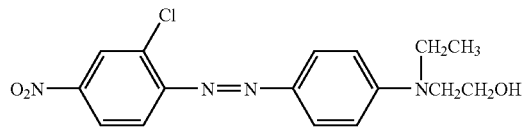

thiazine dyes, triphenylmethane dyes, acridines, oxazines, bisazo dyes such as

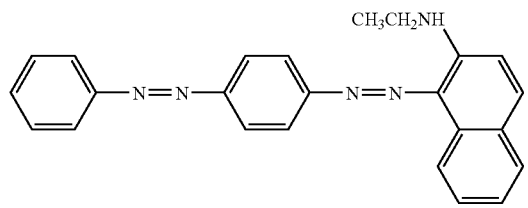

xanthenes or dipyromethenes as are known from EP-A 822 544.

The phthalocyanines of the invention make it possible for information to be stored with high reliability and stability and have a very good mechanical and thermal stability and also display a high light stability and sharp edges of the pits. Particularly advantageous properties are the high signal/noise ratio and the high optical resolution which makes it possible to achieve defect-free recording and reading of the signals even at high speed ($\geq 4\times$) and at the same time low jitter.

The medium of the invention represents, in particular, an optical information storage medium of the WORM type. It can be used, for example, as playable CD (compact disc), as storage materials for computers and video recorders/players, as identity and security card or for the production of diffraction-optical elements, for example holograms.

The invention therefore further provides for the use of the recording medium of the invention for optical recording, storage and reproduction of information, for producing diffraction-optical elements or for the storage of holograms. Recording and reproduction are preferably carried out in a wavelength range from 400 to 500 nm or, particularly preferably, from 600 to 830 nm.

A further embodiment of the present invention provides for the use of the mixtures of the invention and the novel compounds of the formulae IXa to IXd for producing writable optical recording media, with the writing speed being greater than or equal to 8×, preferably greater than or equal to 16×, particularly preferably greater or equal to 32×, and very particularly preferably greater than or equal to 48×.

As a result of the use of the dyes of the invention, the recording media of the invention advantageously have homogeneous, amorphous and low-scattering recording layers whose absorption edge in the solid phase is steep. Further advantages are the high light stability in daylight and under laser radiation of low power density combined with high sensitivity under laser radiation of high power density, the uniform writing width, the good thermal and storage stability and also, in particular, the high optical resolution and the very low jitter.

EXAMPLES

Example 1

97 g of copper tetra($\alpha$-2,4-dimethyl-3-pentyloxy) phthalocyanine ("substance 1", prepared as described in EP 712 904) together with 95 g of N-methylformanilide are introduced into 170 g of chlorobenzene. After heating the mixture to 50° C., 107 g of phosphorus oxychloride are metered in at 48–52° C. over a period of 4 hours. The reaction mixture is then stirred at this temperature for 18 hours. After the reaction has ended, the mixture is poured into a prepared solution of 550 g of sodium acetate in 450 ml of deionized water. The reaction vessel is rinsed with about 100 ml of chlorobenzene. The mixture (emulsion) obtained is stirred vigorously for 30 minutes and then allowed to stand for 1 hour with the stirrer switched off so that the phases separate. After separating off the aqueous phase, the chlorobenzene phase is washed twice with 200 ml each time with water and is dewatered under reduced pressure. The volume of the solution is adjusted to 600 ml with chlorobenzene, and 100 g of silica gel 60 are then added. The resulting suspension is stirred at 25° C. for one hour and subsequently filtered. The residue is washed 4 times with 200 ml each time of chlorobenzene.

The combined chlorobenzene filtrates are distilled under reduced pressure until 300 ml remain and this is then poured into 3.5 l of methanol at 25° C. The suspension obtained is cooled to 10° C. and filtered. The filtercake obtained is washed 3 times with 250 ml each time of methanol and subsequently 4 times with 500 ml each time of deionized water. Drying in a drying oven gives 88 g of a mixture of copper monoformyl-, diformyl- and triformyl-tetra($\alpha$-2,4-dimethyl-3-pentyloxy)phthalocyanine ("substance 2") having the following properties:

UV/VIS: $\epsilon$=160 000 l·mol$^{-1}$·cm$^{-1}$; $\lambda$ max=712 nm (in NMP)

HPLC(area): Starting material<0.2%; monoaldehyde: 68%; di-+ trialdehyde: 32%

Example 2

88 g of "substance 2" obtained in Example 1 are dissolved in 300 g of tetrahydrofuran (THF). After addition of 18 g of methanol, a suspension of 2.5 g of sodium borohydride in 30 g of THF is metered in at 20° C. at a uniform rate over a period of 30 minutes.

The mixture is then stirred for another three hours at 20–25° C. After the reaction is complete, excess NaBH$_4$ is removed by addition of 2.5 g of anhydrous acetic acid.

The reaction mixture is then clarified by filtration through a layer of 90 g of silica gel (Becosorb 1000)/THF. The silica gel layer is washed twice with 90 g each time of THF and the combined filtrates are distilled until a volume of 300 ml remains.

The concentrated solution is poured at a uniform rate into 3.5 l of water at 25° C. over a period of 3 hours while stirring vigorously, the resulting product suspension is filtered and the filtercake is washed with deionized water.

Drying in a drying oven at 70° C. and a pressure of 100 mbar gives 86 g of a mixture of copper mono (hydroxymethyl)-, di(hydroxymethyl)- and tri (hydroxymethyl)-tetra($\alpha$-2,4-dimethyl-3-pentyloxy) phthalocyanine (substance 3) having the following property:

UV/VIS: $\lambda$ max=719 nm (in NMP)

Using a similar method, a mixture of palladium mono (hydroxymethyl)-, di(hydroxymethyl)- and tri (hydroxymethyl)-tetra(α-2,4-dimethyl-3-pentyloxy) phthalocyanine can be obtained when palladium tetra(α-2,4-dimethyl-3-pentyloxy)phthalocyanine (prepared as described in EP-A 712 904) is used as starting material in Example 1.

Example 3

50 g of substance 3 from Example 2 are introduced into 310 g of toluene and stirred at 25° C. until all the solid has gone into solution. A suspension of 31 g of ferrocenecarboxylic acid in 650 g of anhydrous THF is then added. 0.2 g of 98% sulphuric acid as catalyst is then introduced into the stirred reaction mixture. The reaction mixture is heated to boiling (about 74° C.) and the THF is distilled off from the reaction mixture via a Vigreux column at a uniform rate over a period of three hours. The water formed during the reaction is removed at the same time. The internal temperature is allowed to rise from an initial 74° C. to 100° C. At this temperature, the distillation is interrupted and the mixture is refluxed for another three hours. Distillation is then recommenced and the internal temperature is increased to 107° C. over a period of one hour by distilling off THF. The reaction mixture is then cooled to 25° C. and filtered through a suction filter to remove excess ferrocenecarboxylic acid. The residue on the filter is washed twice with 25 g each time of toluene. 50 g of silica gel (Becosorb 1000) and 5 g of activated carbon are introduced into the combined toluene filtrates, the mixture is stirred at 25° C. for one hour, filtered through a suction filter and the residue is washed 4 times with 100 ml each time of toluene. The combined filtrates are distilled at 250 mbar until 175 g remain, cooled to room temperature and introduced into 1600 ml of a mixture of methanol with 5% by volume of water at 0–5° C. to precipitate the end product. After stirring for one hour, the mixture is filtered and the filtercake is washed three times with 140 ml of cold methanol (containing 5% by volume of water) and then three times with 140 ml of water. Drying in a vacuum drying oven at 80° C. and 130 mbar gives a product having the following properties:
$\lambda_{max}$=713.5 nm (in dibutyl ether);
HPLC: Column: C18 reversed phase column
Mobile phase: Gradient of methanol and tetrahydrofuran
Detector: 319 nm
(a) Main components: Ferrocenoyl-substituted copper mono(hydroxymethyl)-tetra(α-2,4-dimethyl-3-pentyloxy) phthalocyanine from Example 2
(b) Dimers+trimers appear as unresolved peak group after the components of the monomers.
Total content of dimeric and trimeric phthalocyanine derivatives (LC area): 36%

Using a similar method, a mixture of ferrocenoyl-substituted and/or etherified palladium mono(hydroxymethyl)-, di(hydroxymethyl)- and tri(hydroxymethyl)-tetra(α-2,4-dimethyl-3-pentyloxy) phthalocyanines and their dimers and trimers can be obtained when the mixture of palladium mono(hydroxymethyl)-, di(hydroxymethyl)- and tri(hydroxymethyl)-tetra(α-2,4-dimethyl-3-pentyloxy) phthalocyanines which can be obtained as described in Example 2 is used as starting material.

Using a similar method, a mixture of ferrocenoyl-substituted and/or etherified palladium and copper mono(hydroxymethyl)-, di(hydroxymethyl)- and tri(hydroxymethyl)-tetra(α-2,4-dimethyl-3-pentyloxy) phthalocyanines and their dimers and trimers can be obtained when the mixture of palladium mono(hydroxymethyl)-, di(hydroxymethyl)- and tri(hydroxymethyl)-tetra(α-2,4-dimethyl-3-pentyloxy) phthalocyanines which can be obtained as described in Example 2 and substance 2 from Example 2 are used as starting materials in a ratio of, for example, 1:1.

Example 3a 50 g of brominated palladium mono(hydroxymethyl)tetra(α-2,4-dimethyl-3-pentyloxy)phthalocyanine (prepared as described in Example 2, from WO 00/09522) are introduced into 310 g of toluene and stirred at 25° C. until all the solid has gone into solution. A suspension of 17.2 g of ferrocenecarboxylic acid in 650 g of anhydrous THF is then added. 0.3 g of 98% sulphuric acid as catalyst is then introduced into the stirred reaction mixture. The reaction mixture is heated to boiling (about 74° C.) and the THF is distilled off from the reaction mixture at a uniform rate over a period of three hours. The water formed during the reaction is removed at the same time. The internal temperature is allowed to rise from an initial 74° C. to 113° C. The reaction mixture is then cooled to 25° C. and filtered through a suction filter to remove excess ferrocenecarboxylic acid. The residue on the filter is washed twice with 25 g each time of toluene. 50 g of silica gel (Becosorb 1000) and 5 g of activated carbon are introduced into the combined toluene filtrates, the mixture is stirred at 25° C. for one hour, filtered through a suction filter and the residue is washed 4 times with 100 ml each time of toluene. The combined filtrates are distilled at 250 mbar until 180 g remain, cooled to room temperature and introduced into 1800 ml of acetonitrile at 0–5° C. to precipitate the end product. After stirring for one hour, the mixture is filtered and the filtercake is washed three times with 140 ml of cold acetonitrile and then three times with 140 ml of water. Drying in a vacuum drying oven at 80° C. and 130 mbar gives a product having the following properties:
$\lambda_{max}$=712.5 nm (in dibutyl ether);
HPLC: Column: C18 reversed phase column
Mobile phase: Gradient of methanol/tetrahydrofuran
Detector: 319 nm
Dimers+trimers appear as unresolved peak group after the components of the monomeric compound (monomers are identical to the sample prepared in Example 8 of WO 00/09522)
Total content of dimeric and trimeric phthalocyanine derivatives (LC area): 17%

Using a similar method, a mixture of ferrocenoyl-substituted and/or etherified palladium mono(hydroxymethyl)tetra(α-2,4-dimethyl-3-pentyloxy) phthalocyanines and their dimers and trimers when unbrominated palladium mono(hydroxymethyl)tetra(α-2,4-dimethyl-3-pentyloxy)phthalocyanine (prepared as described in EP-A 712 904) is used as starting materials.

Example 3b

Example 3 is repeated using 1.2 g of p-toluenesulphonic acid instead of 0.2 g of sulphuric acid.

This gives a product having the following properties:
$\lambda_{max}$=713 nm (in DBE);
Dimers and trimers: 32% LC area Example 4

0.5 g (3.5 mmol) of calcium hypochlorite and 15 ml of water are placed in a 25 ml round-bottom flask and, while cooling (0–5° C.) and under an inert gas atmosphere (nitrogen), 1.5 ml of acetic acid are added. After stirring for 2 to 3 minutes, a light-yellow solution is obtained. 3.0 g (2.4 mmol) of the product as described in Example 3 in 60 ml of dichloromethane are added to this solution at 0–5° C. The mixture is then stirred at room temperature for another 3 hours. The reaction mixture is washed in succession with 10% of NaHCO$_3$ solution and twice with water, then dried over MgSO$_4$, filtered and purified by means of flash chromatography. The purified product is dissolved in 20 ml of THF and precipitated by addition of water (300 ml). The green precipitate obtained in this way is filtered off, then washed twice with water and dried overnight at 60° C./160 mbar. This gives 2.01 g (65% of theory) of a chlorinated mixture of ferrocenyl-substituted copper mono (hydroxymethyl)-, di(hydroxymethyl)- and tri(hydroxymethyl)tetra(α-2,4-dimethyl-3-pentyloxy) phthalocyanines having the following properties: UV/VIS: $\lambda_{max}$=716.5 nm (EtOH), chlorine content=1.97%, iron content=5.1%.

TGA: Point of inflection of the decomposition curve= 257° C.

Example 5

In a 250 ml round-bottom flask provided with magnetic stirrer and nitrogen blanketing, 10 g (9.4 mmol) of the product as described in Example 1 in 135 ml of chlorobenzene are added at 0–5° C. to a mixture of 0.6 g (4.2 mmol) of calcium hypochlorite, 15 ml of water and 1.5 ml of acetic acid. The green solution is stirred at room temperature for 3 hours.

The mixture is then worked up as described in Example 4. This gives 8.17 g (79% of theory) of a chlorinated mixture of copper monoformyl-, diformyl- and triformyl-tetra(α-2,4-dimethyl-3-pentyloxy)phthalocyanines having the following properties: $\lambda_{max}$=714 nm (EtOH), chlorine content= 2.1%, IR: C=0 band at 1636 cm$^{-1}$.

Example 6

A 2.5% strength by weight solution of a "substance 6a" (prepared as described in Examples 1 to 3 but using amounts of N-methylformanilide and POCl$_3$ reduced by 15% in comparison with Example 1 and an amount of NaBH$_4$ reduced by 15% in comparison with Example 2) (oligomer content 32% by weight) in a mixture of tert-amyl alcohol and 2,6-dimethyl-4-heptanone (90:10) is filtered through a Teflon filter having a pore opening of 0.2 μm and applied to the surface of a 1.2 mm thick, grooved (groove depth: 225 nm, groove width: 575 nm, groove spacing: 1.6 μm) disc by spin coating at a speed of rotation of 500 rpm. The excess of solution is spun off by increasing the speed of rotation. The uniformly applied layer is then dried at 70° C. in a convection oven for 20 minutes. The absorption spectrum is measured over the visible spectrum by means of a spectrophotometer, and the wavelength of the absorption maximum ($\lambda_{max}$) is determined as 732 nm. A 60 nm thick silver layer is subsequently deposited on the resulting recording layer in a vacuum coating apparatus (Swivel, Balzers). An 8 μm thick protective layer of a UV-curing photopolymer (650-020 from DSM) is then applied thereto by spin coating. The disc produced in this way is tested by means of a commercial tester (Pulstec OMT 2000) at a writing speed of 4× (4.8 m/s) and the optimum writing power according to the "Orange Book" (Optimum Power Control and Recording Conditions) is determined as 13.8 mW. The measured results are shown in Table A below.

Example 7

Example 6 is repeated using a "substance 6b" prepared as described in Examples 1 to 3, but, unlike Example 3, the reaction is stopped after a hold time of 3 hours at 100° C. and the internal temperature is not allowed to rise beyond 100° C. (oligomer content: 41% by weight). The absorption maximum ($\lambda_{max}$) is in this case determined as 733.3 nm and the optimum writing power is found to be 13.1 mW. The measured results of Examples 6 and 7 are summarized in Table A.

TABLE A

| | Oligomer content | $\lambda_{max}$ [nm] | Optimum laser power [mW] |
|---|---|---|---|
| Example 6 | 32% | 732 | 13.8 |
| Example 7 | 41% | 733.3 | 13.1 |

Example 8

A 2.5% strength by weight solution of a compound analogous to "compound 6a" as described in Example 6 but having an oligomer content of 30% in a mixture of tert-amyl alcohol and 2,6-dimethyl-4-heptanone (90:10) is filtered through a Teflon filter having a pore opening of 0.2 μm and applied to the surface of a 1.2 mm thick, grooved (groove depth: 225 nm, groove width: 575 nm, groove spacing: 1.6 μm) disc by spin coating at a speed of rotation of 500 rpm. The excess of solution is spun off by increasing the speed of rotation. The uniformly applied layer is then dried at 70° C. in a convection oven for 20 minutes. The optical density of the dye layer is measured at a wavelength of 680 nm by means of a photometer (Dr. Schenk). A 60 nm thick silver layer is subsequently deposited on the resulting recording layer in a vacuum coating apparatus (Swivel, Balzers). An 8 μm thick protective layer of a UV-curing photopolymer (650-020 from DSM) is then applied thereto by spin coating.

This production procedure is repeated at different speeds of rotation in the spin coating step to produce discs having various optical densities. Data are written onto the discs produced in this way by means of commercial CD burners at various writing speeds (1× to 12×). For each writing speed and each optical density, the dynamic signal parameters are subsequently determined by means of a fully automatic CD test system (CD-Cats SA3, Audio Development) and compared with the "Orange Book" specifications. All discs which fully meet the specifications for all writing speeds are within the "processing window". Conversely, discs for which at least one parameter does not meet the specifications lie outside the window. The width of the "processing window" is defined by the difference between the highest and lowest optical densities of the discs within the "processing window". In this context, the optical density (OPD) is defined as 1000 times the absorption at 680 nm (Dr. Schenk photometer). For example, the processing window can be from OPD=295 to OPD=310 and thus have a width of 15. The wider the "processing window", the more tolerant is the production process for high-quality discs.

For speeds from 1× (Philips) to 8× (Teac) a width of the "processing window" of 9 is determined, while for 1× (Philips) to 12× (Plextor), a window of 2 is determined.

Example 9

Example 8 is repeated using a compound analogous to "compound 6a" as described in Example 6 but with an oligomer content of 37%. The width of the "processing window" is 16 for from 1× to 8×, and 13 for from 1× to 12×, cf. Table B.

TABLE B

| Oligomer content | Width of processing window [optical density points] | |
| --- | --- | --- |
| | Philips1x - Teac8x | Philips1x - Plextor12x |
| Example 8 30% | 9 | 2 |
| Example 9 37% | 16 | 13 | where

[Pht]

is copper tetra($\alpha$-2,4-dimethyl-3-pentyloxy)phthalocyanine

[Fer]

is $FeCp_2$.

The "higher oligomers" are essentially trimeric compounds plus smaller amounts of tetramers and higher oligomers. The main part of this fraction is composed essentially of the following components:

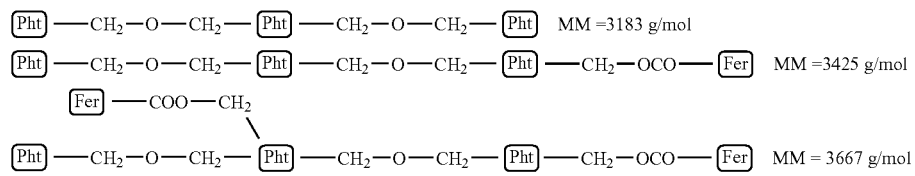

Example 10

25 g of the substance as described in Example 3 are applied to a preparative column (length of separation section: 1.2 m, diameter: 5 cm, silica gel 60 (Merck), eluant: toluene) and eluted by means of a toluene solution. The fractions comprising the monomers, dimers and the higher oligomers are collected individually and the eluates are subsequently evaporated. The precipitate is dried for 12 hours at 60° C./165 mbar. The wavelengths of the absorption maximum (20 mg/l in t-amyl alcohol, d=0.5 cm) and the content (% by weight) of bound iron of the fractions are shown in Table C.

TABLE C

| Fraction | $\lambda$ | Fe |
| --- | --- | --- |
| Monomers | 712.5 nm | 4.9% |
| Dimers | | 3.1% |
| Higher oligomers | | 1.6% |

The dimers consist mainly of phthalocyanines having the composition

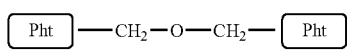

MM = 2108 g/mol

MM = 2350 g/mol

Example 11

A 2% strength by weight solution (tert-amyl alcohol) of the substance as described in Example 3 is applied to a glass support by spin coating and dried at 70° C. in an oven for 20 minutes. The thickness of the dry dye layer is 50 nm. This results in a transparent homogeneous layer having a green colour and a maximum absorption of 0.545 A at $\lambda_{max}$=734 nm and an absorption of 0.137 A at 780 nm.

A layer of the substance as described in Example 3a produced in a similar manner has a maximum absorption of 0.58 A at $\lambda$=730 nm and an absorption of 0.131 A at 780 nm.

Example 12

25 g of the substance as described in Example 3a are fractionated by a method similar to Example 10. The fraction comprising the monomers is discarded and the fraction comprising the dimers and oligomers is collected and dried. A 2% strength by weight solution (tert-amyl alcohol) of this substance is applied to a glass support using a method similar to Example 11 and the absorption spectrum of the solid is measured over the visible wavelength range of 400–800 nm. The absorption maximum of the substance comprising dimers and higher polymers is determined as $\lambda$=737 nm, compared with a mixture as described in Example 6 for which 732 nm is determined.

Example 13

The components of a mixture of ferrocenoyl-substituted and/or etherified copper mono(hydroxymethyl)-, di(hydroxymethyl)- and tri(hydroxymethyl)-tetra($\alpha$-2,4-dimethyl-3-pentyloxy)phthalocyanine monomers and oligomers as described in Example 3 are separated on a preparative column as described in Example 10. The thermodynamic properties of the dried fractions are subsequently determined by means of DSC (Mettler-Toledo Star-System, 35° C. 45 min, 35–450° C. 4° C./min, Tiegel HP gold-plated 50 l) and TGA (Mettler-Toledo Star System, 35–420° C. 10° C./min, N2 200 ml/min, Tiegel alumina 50 l). The DSC curve is flat up to about 200° C. No melting point (endothermic) is observed. A fraction-specific, exothermic decomposition peak appears in the range 180–320° C., with the onset temperature of the monomers being higher and the endset temperature being lower than those of the dimers, the higher oligomers and the mixture (cf. Table D).

The corresponding TGA data for the fractions, including 1:1 monomer/dimer mixtures (mixture A) and monomer/higher oligomer mixtures (mixture B) are shown in Table E.

Example 15

2% strength by weight solutions (tert-amyl alcohol) of the substances as described in Example 3 and Example 3a are each applied by spin coating to a smooth (groove-free) polycarbonate disc substrate and dried at 70° C. in an oven for 20 minutes. The reflection spectra and the transmission spectrum of the dye layer are subsequently measured by means of an array spectrometer (ETA Optik) in the range 390–1000 nm, and the complex index of refraction (n-ik) over the spectrum and the layer thickness were determined therefrom. The values at the wavelengths 780 nm, ($n_{max}$) and ($k_{max}$) are shown in Table F.

TABLE F

| | Substance 3 | | | Substance 3a | | |
|---|---|---|---|---|---|---|
| | 780 nm | 758 nm | 728 nm | 780 nm | 754 nm | 723 nm |
| n – ik | 2.27 – i0.090 | 2.58 – i0.530 ($n_{max}$) | 1.82 – i1.260 ($k_{max}$) | 2.27 – i0.075 | 2.58 – i0.546 ($n_{max}$) | 1.84 – i1.320 ($k_{max}$) |

TABLE D

| Fraction | Onset | Peak exoth. | Endset | Integral exoth. |
|---|---|---|---|---|
| Monomers | 220° C. | 255° C. | 270° C. | 45 J/g |
| Dimers | 190° C. | 230/270° C. | 310° C. | 105 J/g |
| Higher oligomers | 185° C. | 270° C. | 320° C. | 170 J/g |
| Mixture | 185° C. | 255° C. | 320° C. | 60 J/g |

TABLE E

| Fraction | Step | Onset | Point of inflection | Midpoint |
|---|---|---|---|---|
| Monomers | –34% | 282° C. | 308° C. | 317° C. |
| Dimers | –34% | 292° C. | 335° C. | 329° C. |
| Higher oligomers | –34% | 295° C. | 312° C. | 326° C. |
| Mixture A | –37% | 290° C. | 337° C. | 324° C. |
| Mixture B | –35% | 294° C. | 333° C. | 326° C. |

Example 14

A 2% strength by weight solution (tert-amyl alcohol) of the substance as described in Example 3 is applied to a glass support by means of spin coating and dried at 70° C. in an oven for 20 minutes. The dye layer (green) is covered with a second glass support. The two glass supports are subsequently fixed together by means of a metal clamp. Five such specimens are heated to 240° C. in an oven. A specimen is then taken out and the temperature is increased to 245° C., another specimen is taken out and the temperature is increased to 250° C., and so forth. Visual inspection of the cool specimens shows that the dye layer fades in the range from 250° C. to 255° C. (colour change from green to yellow). Photometric measurement of the absorption spectra confirms that the long-wavelength absorption band gradually disappears in the range from 245° C. to 260° C., with the greatest decrease occurring in the range 250–255° C.

The substance as described in Example 3a displays similar fading behaviour, but the absorption band has disappeared by 255° C.

Example 16

25 g of the substance as described in Example 3a are fractionated by a method similar to Example 10. The fraction comprising the monomers is discarded and the fraction comprising the dimers and higher oligomers is collected and dried. This is subsequently used to produce a disc in a manner similar to Example 8. It is found that good-quality discs can be achieved at a layer thickness which is about 10% lower.

Example 17

Using a 2% strength by weight solution of a substance as described in Example 3 in a mixture of tert-amyl alcohol and 2,6-dimethyl-4-heptanone (90:10) which has been filtered through a 0.2 µm Teflon filter, CD-R's (74 min.) are produced on a production line (Steag) by a method similar to that described in Example 6 (groove depth: 212 nm, groove width (half height): 565 nm, wall inclination: 63°, reflector: 70 nm Ag, protective layer: 8 µm). The spinning process is carried out in such a manner that the optical density of the recording layer is 360 units (ETA-Optik photometer).

The discs are written on at various writing speeds from 1× to 16× (Audio Tracks) on various commercial CD-R recorders (Philips CDD3600, Yahama 8424RW, Teac R558S Panasonic CW7503, Plextor 8220, Plextor 12432, Sanyo 12x, Yahama 2100 16x) and analysed by means of a CDA SL100 test system (CD Associates). Result: All the discs tested meet the "Orange Book" specifications.

Example 18

Using a 3% strength by weight solution of a substance as described in Example 3a in a mixture of dibutyl ether and 2,6-dimethyl-4-heptanone (97:3) which has been filtered through a 0.2 µm Teflon filter, CD-R's (74 min.) are produced on a production line (Steag) by a method similar to that described in Example 17 and tested. Result: All discs tested meet the "Orange Book" specifications.

Example 19

To determine the properties at high recording speeds, the discs produced as described in Example 17 are written on at various speeds (16×, 24×, 32×) using various layer powers and writing strategies (defined in the "Orange Book", Part II, Vol. 2, Multi-Speed CD-R) on a laboratory system (noncommercial) and subsequently tested. The following optimum writing parameters or jitter values (mean of 3T to 11T jitter in % of 1T) are found (Table G):

TABLE G

| Speed | Θ | ΔT/T | ΔP/P$_{op}$ | Power P$_{opt}$ | Land jitter | Pit jitter |
|---|---|---|---|---|---|---|
| 16× | −0.5T | 0.18 | 6% | 21 mW | 9% | 9% |
| 24× | −0.5T | 0.23 | 7% | 26 mW | 10% | 11% |
| 32× | −0.5T | 0.25 | 7% | 34 mW | 9% | 11% |

Example 20

Using a 3% strength solution of a substance as described in Example 3 in a mixture of dibutyl ether and 2,6-dimethyl-4-heptanone (97:3) which has been filtered through a 0.2 μm Teflon filter, discs are produced as described in Example 9b. A disc chosen at random is written on at a speed of 48 m/s (40×) (Θ=−0.5TΔP/P$_{opt}$=10%) on a commercial test system (Pulstec DUU 1000) and subsequently tested. The results are summarized in Table H (for the meanings of the parameters, see "Orange Book", Part II, Vol. 2, Multi-Speed CD-R).

TABLE H

| Pwr | Time | BLER | Sym | Refl | I3 | I11 | I3R | I11R |
|---|---|---|---|---|---|---|---|---|
| 46 mW | 53.02' | 3182" | 3 | −0.7 | 66.7% | 0.304 | 0.629 | 0.357 | 0.737 |

| PP$_{min}$ | PP$_{max}$ | JL3T | JL11T | JP3T | JP11T | DL3T | DL11T | DP3T | DP11T |
|---|---|---|---|---|---|---|---|---|---|
| 0 | 0 | 38 ns | 30 ns | 42 ns | 30 ns | −56 ns | 32 ns | −50 ns | 12 ns |

Example 21

2.75% by weight of a substance as described in Example 3 and 0.25% by weight of a substance A are dissolved in a solvent mixture of dibutyl ether and 2,6-dimethyl-4-heptanone (97:3). The solution is filtered though a 0.2 μm Teflon filter and then used to produce discs having a recording layer which has a colourless (metallic) appearance by a method similar to Example 17. A similar effect is achieved using 2.70% by weight of a substance as described in Example 3a and 0.3% by weight of a substance B.

A

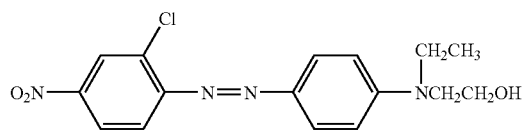

B

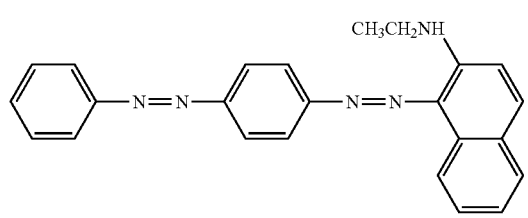

Example 22

The solution spun off during the spinning process in the production of discs as described in Example 17 is collected in a closed container. After a production time of 24 hours, the container is changed and the solution is analysed photometrically and by gas chromatography. After addition of the amounts of the two solvent components required to reestablish the desired concentrations, the solution is returned to the production circuit. The quality of the discs is checked periodically. After 10 cycles, no change in the quality is found.

The recycling process is likewise carried out for the production processes of Examples 18 and 20 over 10 cycles without a deterioration in quality.

What is claimed is:

1. A mixture of metallocenyl phthalocyanines, obtained by reacting a mixture A comprising (a) from 1 to 99% by weight of a phthalocyanine of the formula I

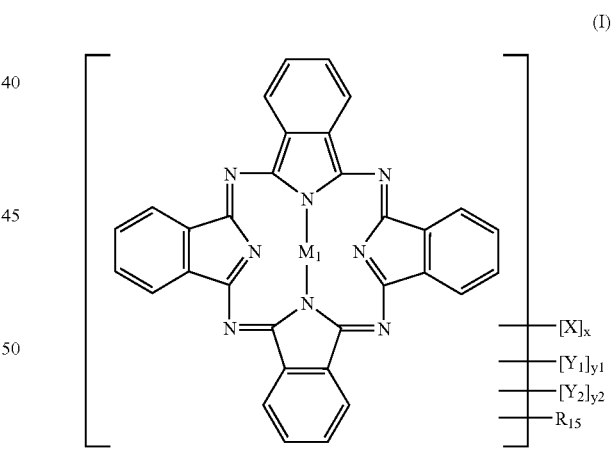

where M$_1$ is a divalent metal, an oxo-metal group, a halo-metal group or a hydroxy-metal group or two hydrogen atoms, where one or two ligands may be bound to the divalent metal atom, the oxo-metal group, the halo-metal group or the hydroxy-metal group, X is halogen, Y$_1$ is —OR$_1$, —OOC—R$_2$, —NHR$_1$, —N(R$_1$)R$_2$, —SR$_1$, Y$_2$ is —CHO, —CH(OR$_3$)OR$_4$, —CH=N—OH, —CH=N—OR$_3$, —CH=N—NHR$_5$, —CH=N—N(R$_3$)R$_5$, —CH$_2$OH, —(CH$_2$)$_{2-20}$OH, —CH$_2$OR$_3$, —CH$_2$OOC—R$_3$, —CO—R$_3$, —COOH or —COOR$_3$, R$_1$ to R$_5$ are each independently of one another, unsubstituted or halogen-, hydroxy-, C$_1$–C$_{20}$alkoxy-, $C_1$–$C_{20}$alkylamino- or $C_2$–$C_{20}$dialkylamino-substituted $C_1$–$C_{20}$alkyl, which may be interrupted by —O—, —S— or —$NR_{11}$—, where $R_{11}$ is $C_1$–$C_6$alkyl, and $R_1$ and $R_2$ may also be $C_5$–$C_{20}$cycloalkyl, $C_2$–$C_{20}$alkenyl, $C_5$–$C_{12}$cycloalkenyl, $C_2$–$C_{20}$alkynyl, $C_6$–$C_{18}$aryl or $C_7$–$C_{18}$aralkyl, x is a rational number from 0 to 8, $y_1$ is a rational number from 0 to 6

$y_2$ is a rational number from 0 to 4, where $(x+y_1+y_2) \leqq 16$, and $R_{15}$ is a hydroxyl-containing radical, a carboxyl-containing radical or a radical containing an acid chloride group, and (b) from 99 to 1% by weight of a phthalocyanine of the formula II (II)

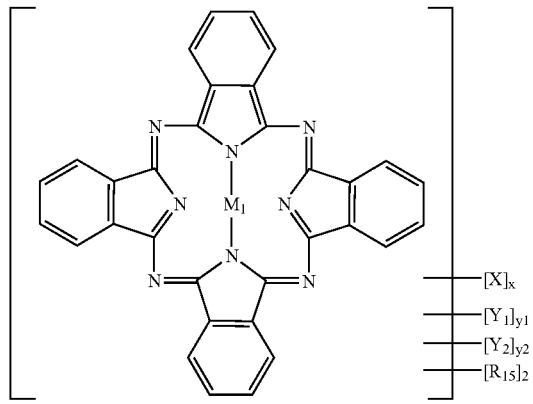

where $M_1$, X, $Y_1$, $R_{15}$, x, $y_1$ and $y_2$ are as defined above with a metallocene derivative in the presence of a catalyst.

2. A mixture according to claim 1 which comprises the following main components:

(a) from 1 to 99% by weight of a metallocenyl phthalocyanine or its metal complex with a divalent metal, oxo-metal, halo-metal or hydroxy-metal, in which at least one of the four phenyl rings of the phthalocyanine bears at least one metallocene radical as substituent bound via a bridging unit E, where E comprises a chain of at least two atoms or atom groups selected from the group consisting of —$CH_2$—, —C(=O)—, —CH($C_1$–$C_4$alkyl)-, —C($C_1$–$C_4$alkyl)$_2$—, —NH—, —S— and —O—, and (b) from 99 to 1% by weight of a metallocenyl phthalocyanine compound selected from the group consisting of phthalocyanine compounds V, comprising two phthalocyanine units linked via a single bond or a bridging atom or molecule, phthalocyanine compounds VI, comprising three phthalocyanine units linked in each case via a single bond or a bridging atom or molecule, and phthalocyanine compounds VII, comprising four phthalocyanine units linked in each case via a single bond or a bridging atom or molecule.

3. A metallocenyl phthalocyanine compound selected from the group consisting of phthalocyanine compounds V comprising two phthalocyanine units linked via a single bond or a bridging atom or molecule, phthalocyanine compounds VI comprising three phthalocyanine units linked in each case via a single bond and/or a bridging atom or molecule and phthalocyanine compounds VII comprising four phthalocyanine units linked in each case via a single bond and/or a bridging atom or molecule.

4. A metallocenyl phthalocyanine of the formula VIII $$(Pc)_{a1}(Xa)_{a2}(Ya)_{a3}(Za)_{a4}(Ma)_{a5}(-L-)_{a6} \quad (VIII)$$

where Pc is phthalocyanine or its metal complex of a divalent metal, oxo-metal, halo-metal, hydroxy-metal or 2 hydrogen atoms, Xa, Ya, Za, Ma and -L- are substituents on the peripheral carbon skeleton, and Xa is halogen, Ya is substituted or unsubstituted alkoxy, alkylamino or alkylthio, Za is a formyl, carbonyl, hydroxymethyl or carboxy group, Ma is a substituent comprising at least one metallocene radical, -L- is a single bond, —$(CH_2)_{a7}$—, where a7=1, 2, 3 or 4, a group —O— or —$(CH_2)_{a7}$—O—$(CH_2)_{a8}$—, where a8=1, 2, 3 or 4, an ester group, an amide group or a divalent metallocenyl group, and a1 is 1, 2, 3, 4, 5, 6, 7, 8, 9 or 10, a2 is a rational number from 0 to 8, a3 is a rational number from 0 to 6 a4 is a rational number from 0 to 4, a5 is a rational number from 0 to 4, a6 is a rational number from 1 to 4, where$(a2+a3+a4+a5+a6) \leqq 16$ and $1 \leqq (a4+a5+a6) \leqq 4$.

5. A compound according to claim 4, in which a1 is 1, a2 is zero, Ya is 2,4-dimethyl-3-pentyloxy, a3 is 4, a4 is zero, a5 is zero, a6 is 1 and L is —$CH_2$—O—$CH_2$— and which has the formula IXa (IXa)

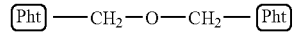

where

is copper tetra(α-2,4-dimethyl-3-pentyloxy)phthalocyanine and L is located in the para position relative to Ya.

6. A compound according to claim 4 in which a1 is 2, a2 is zero, Ya is 2,4-dimethyl-3-pentyloxy, a3 is 4, a4 is zero, a5 is 1, Ma is —$CH_2$—OCO—$FeCp_2$, a6 is 1 and L is —$CH_2$—O—$CH_2$— and which has the formula IXb (IXb)

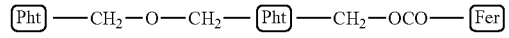

where

is copper tetra(α-2,4-dimethyl-3-pentyloxy)phthalocyanine, L is located in the para position relative to Ya and

is $FeCp_2$.

7. A compound according to claim 4 in which a1 is 3, a2 is zero, Ya is 2,4-dimethyl-3-pentyloxy, a3 is 4, a4 is zero, a5 is 0, a6 is 2 and L is —$CH_2$—O—$CH_2$— and which has the formula IXc (IXc)

where

is copper tetra(α-2,4-dimethyl-3-pentyloxy)phthalocyanine and L is located in the para position relative to Ya.

8. A compound according to claim 4 in which a1 is 3, a2 is zero, Ya is 2,4-dimethyl-3-pentyloxy, a3 is 4, a4 is zero, a5 is 1, Ma is —$CH_2$—OCO—$FeCp_2$, a6 is 2 and L is —$CH_2$—O—$CH_2$— and which has the formula IXd

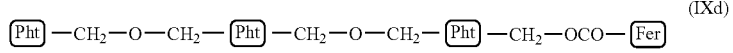 (IXd)

wherein

is copper tetra(α-2,4-dimethyl-3-pentyloxy)phthalocyanine,

L is located in the para position relative to Ya and

is FeCp$_2$.

9. A process for preparing a mixture according to claim 1, which comprises reacting a mixture comprising (a) from 1 to 99% by weight of a phthalocyanine of the formula I according to claim 1 and (b) from 99 to 1% by weight of a phthalocyanine of the formula II according to claim 1 with a metallocene derivative in the presence of a catalyst.

10. A process for preparing the metallocenyl phthalocyanine compound or compounds of formula VIII

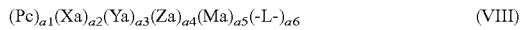 (VIII)

where Pc is phthalocyanine or its metal complex of a divalent metal, oxo-metal, halo-metal, hydroxy-metal or 2 hydrogen atoms, Xa, Ya, Za, Ma and -L- are substituents on the peripheral carbon skeleton, and Xa is halogen, Ya is substituted or unsubstituted alkoxy, alkylamino or alkylthio, Za is a formyl, carbonyl, hydroxymethyl or carboxy group, Ma is a substituent comprising at least one metallocene radical, -L- is a single bond, —(CH$_2$)$_{a7}$—, where a7=1, 2, 3 or 4, a group —O— or —(CH$_2$)$_{a7}$—O—(CH$_2$)$_{a8}$—, where a8=1, 2, 3 or 4, an ester group, an amide group or a divalent metallocenyl group, and a1 is 1, 2, 3, 4, 5, 6, 7, 8, 9 or 10, a2 is a rational number from 0 to 8, a3 is a rational number from 0 to 6, a4 is a rational number from 0 to 4, a5 is a rational number from 0 to 4, a6 is a rational number from 1 to 4, where (a2+a3+a4+a5+a6)≦16 and 1≦(a4+a5+a6)≦4, comprising the steps of reacting a mixture comprising
(a) from 1 to 99% by weight of a phthalocyanine of the formula I according to claim 1 and
(b) from 99 to 1% by weight of a phthalocyanine of the formula II according to claim 1 with a metallocene derivative in the presence of a catalyst, and isolating the product.

* * * * *